(12) United States Patent
Imai et al.

(10) Patent No.: US 6,546,249 B1
(45) Date of Patent: Apr. 8, 2003

(54) SEAMLESS TWO-WAY ROADWAY COMMUNICATION SYSTEM

(75) Inventors: Masaharu Imai, Osaka (JP); Nobuo Yumoto, Osaka (JP)

(73) Assignee: Sumitomo Electric Industries, LTD, Osaka (JP)

( * ) Notice: Subject to any disclaimer, the term of this patent is extended or adjusted under 35 U.S.C. 154(b) by 0 days.

(21) Appl. No.: 09/504,705

(22) Filed: Feb. 16, 2000

(30) Foreign Application Priority Data

| May 11, 1999 | (JP) | 11-130292 |
| Oct. 29, 1999 | (JP) | 11-309664 |
| Feb. 26, 1999 | (JP) | 11-049815 |

(51) Int. Cl.$^7$ .................................. H04Q 7/20
(52) U.S. Cl. ................... 455/436; 455/443; 455/442; 455/450; 455/453
(58) Field of Search ..................... 455/443, 442, 455/344, 450, 436, 452, 453

(56) References Cited

U.S. PATENT DOCUMENTS

| 4,306,313 A | * | 12/1981 | Baldwin | 455/601 |
| 4,953,157 A | * | 8/1990 | Franklin et al. | 730/60 |
| 5,101,501 A | * | 3/1992 | Gilhousen et al. | 455/33 |
| 5,640,414 A | * | 6/1997 | Blankeney, II et al. | 375/200 |
| 5,920,821 A | * | 7/1999 | Seazholtz et al. | 455/466 |
| 6,016,426 A | * | 1/2000 | Bodell | 455/422 |
| 6,088,349 A | | 7/2000 | Zumkeller | 370/345 |
| 6,125,276 A | * | 9/2000 | Lupien | 455/436 |
| 6,167,269 A | * | 11/2000 | Kondo | 455/437 |
| 6,208,861 B1 | * | 3/2001 | Suzuki | 455/441 |
| 6,233,454 B1 | * | 5/2001 | Sato | 455/437 |
| 6,181,921 B1 | * | 7/2001 | Konisi et al. | 455/186.2 |
| 6,330,609 B1 | * | 11/2001 | Garofalakis et al. | 709/229 |
| 6,351,651 B1 | * | 2/2002 | Hamabe et al. | 455/522 |
| 6,366,309 B1 | * | 4/2002 | Seigle | 348/21 |
| 6,366,778 B1 | * | 4/2002 | Bender et al. | 455/442 |
| 6,381,234 B2 | * | 4/2002 | Sakoda et al. | 370/336 |
| 6,108,548 A1 | * | 8/2002 | Furukawa et al. | 455/442 |

FOREIGN PATENT DOCUMENTS

| EP | 0 692 889 A1 | 1/1996 |
| JP | 03126328 | 5/1991 |
| JP | 8-241495 | 9/1996 |
| JP | 9-238104 | 9/1997 |
| JP | 09284251 | 10/1997 |
| JP | 9-358581 | 12/1997 |
| JP | 10261193 | 9/1998 |
| JP | 11-266194 | 9/1999 |

OTHER PUBLICATIONS

"'Fibre/Radio' for the Provision of COrdless/Mobile Telephony Services in the Access Network" Electron. Lett., vol. 26, No. 24, Nov. 1990.

"Repeated Transmission Method using OFDM in MultiCasting Communication Systems" by Asano et al. The Institute of Electronics, Information and Communication Engineers, Technical Report of IEICE, DSP98–147, SAT98–67, RCS98–169 (1999–01).

European Search Report (EP 00 30 1348), dated Aug. 30, 2000.

* cited by examiner

Primary Examiner—William Trost
Assistant Examiner—Thang Le
(74) Attorney, Agent, or Firm—Knoble & Yoshida, LLC

(57) ABSTRACT

The road communication system and method seamlessly communicate different data sets of information between a stationary unit and a mobile unit while the mobile unit is moving across the cell boundaries of the stationary units. Furthermore, the road communication system and method utilize a common frequency to seamlessly communicate data substantially without the carrier and code interference.

50 Claims, 22 Drawing Sheets

| FREQUENCY \ STATIONS | BS1 | BS2 | BS3 | BS4 | BS5 | BS6 |
|---|---|---|---|---|---|---|
| UPPER SIDE | A | A | A | B | B | B |
| LOWER SIDE | C | C | C | C | C | C |

B

| FREQUENCY \ STATIONS | BS1 | BS2 | BS3 | BS4 | BS5 | BS6 |
|---|---|---|---|---|---|---|
| UPPER SIDE | A | A | A | B | B | B |
| LOWER SIDE | C | C | C | C | C | C |

C

| FREQUENCY \ STATIONS | BS1 | BS2 | BS3 | BS4 | BS5 | BS6 |
|---|---|---|---|---|---|---|
| UPPER SIDE | A | A | A | B | B | B |
| LOWER SIDE | C | C | A | A | C | C |

D

| FREQUENCY \ STATIONS | BS1 | BS2 | BS3 | BS4 | BS5 | BS6 |
|---|---|---|---|---|---|---|
| UPPER SIDE | A | A | A | B | B | B |
| LOWER SIDE | C | C | A | A | C | C |

|  | St0 | St1 | St2 | St3 | St4 | St5 | St6 | St7 |
|---|---|---|---|---|---|---|---|---|
| A | X | X | Y | Y | Y | Y | Z | Z |
| B | X | X | X | Y | Y | Y | Y | Z |
| C | X | X | X | X | Y | Y | Y | Y |
| D | W | X | X | X | X | Y | Y | Y |
| E | W | W | X | X | X | X | Y | Y |

B

|  |  |  |  | N |  |  |  |
|---|---|---|---|---|---|---|---|
| A | X | /// | Y | Y | Y | /// | Z |
| B | X | X | /// | Y | Y | Y | /// |
| C | X | X | X | /// | Y | Y | Y |
| D | /// | X | X | X | /// | Y | Y |
| E | W | /// | X | X | X | /// | Y |

C

| A | X | /// |
|---|---|---|
| B | /// | Y |

SEAMLESS TWO-WAY ROADWAY COMMUNICATION SYSTEM

FIELD OF THE INVENTION

The current invention is generally related to a two-way communication system between a mobile unit and a stationary unit, and more particularly related to a two-way communication system between a car and information stations located along a road.

BACKGROUND OF THE INVENTION

A road communication system enables a ground vehicle such as a car to communicate with a traffic control or a road administration for disseminating or collecting information on traffic or road conditions. The information is gathered by stationary units along the road and is also collected by various sensors on a car. The information exchange is designed to help drivers avoid accidents as well as to automatically navigate the car without human intervention. One example of the above described road communication system is disclosed in Japanese Patent Laid Publication Hei8-241495. To implement the road communication system, it is necessary to place a continuous array of communication cells or stationary units along the roads. Although a leaking coaxial cable may be placed along the roads, not only the construction is significant, but also the radio signal travels only a short distance in a cross direction due to the low position of the cable. In contrast to the disadvantage of the cable, antennas are placed at a predetermined interval along the roads to communicate with cars. Each antenna covers a predetermined relatively wide transmission area or cell. Each antenna may be connected to a base unit of a road administrator via optical fibers.

In the prior art, each cell used a different frequency to prevent the communication from experiencing inter-carrier interference and or inter-symbol interference. Although the above system is advantageous for communication between stationary units, the above system may not be advantageous for the road communication system. Since the road communication system includes a mobile unit such as one used in a car which moves at a high speed and passes a number of cells over a short period time, it is necessary for a car to be equipped with a device for switching reception frequencies at a high speed. Consequently, a mobile unit needs a high-speed oscillator or a plurality of oscillators. The required additional hardware is either costly or takes physical space. For the above reasons, it was desired that a common frequency is used for the road communication system provided that the occurrence of the inter-carrier and inter-symbol interference is prevented. Japanese Patent Laid Publication Hei 9-358581 discloses ways to provide a stable signal containing the same data while a car moves across cells. In other words, the identical information is transmitted from every stationary unit. Some parts of Japanese Patent Laid Publication Hei 11-266194 are prior art in view of disclosures in its parent case Hei 9-358581 while other parts of Hei 11-266194 are not prior art.

The above prior art lacks disclosures on techniques for seamlessly communicating different sets of information between a stationary unit and a mobile unit while the mobile unit is moving across the cell boundaries of the stationary units. Furthermore, it has been desired that a common frequency is used for the road communication system to seamlessly communicate different data substantially without the carrier and code interference.

SUMMARY OF THE INVENTION

In order to solve the above and other problems, according to a first aspect of the current invention, a method of transmitting information via a common frequency carrier between a mobile unit and a set of stationary units, including: transmitting first data on a predetermined first subcarrier and second data on a predetermined second subcarrier between a first stationary unit and the mobile unit for communication within a predetermined first transmission area; transmitting third data on the predetermined first subcarrier and the second data on the predetermined second subcarrier between a second stationary unit and the mobile unit for communication within a predetermined second transmission area, the second stationary unit being located near the first stationary unit, the predetermined first transmission area and the predetermined second transmission area being partially overlapping; and maintaining communication among the mobile unit, the first stationary unit and the second stationary unit while the mobile unit is moving from the predetermined first transmission area to the predetermined second transmission area.

According to a second aspect of the current invention, a method of transmitting information via a common frequency carrier between a mobile unit and a set of stationary units, including: transmitting an information signal which is modulated by orthogonal frequency division multiplex modulation between a first stationary unit and the mobile unit for communication within a predetermined first transmission area; transmitting the information signal which is modulated by the orthogonal frequency division multiplex modulation between a second stationary unit and the mobile unit for communication within a predetermined second transmission area, the second stationary unit being located near the first stationary unit, the predetermined first transmission area and the predetermined second transmission area being partially overlapping; and maintaining communication among the mobile unit, the first stationary unit and the second stationary unit while the mobile unit is moving from the predetermined first transmission area to the predetermined transmission second area.

According to a third aspect of the current invention, a system for transmitting information via a common frequency carrier between a mobile unit and a set of stationary units, including: a first stationary unit for transmitting first data on a predetermined first subcarrier and second data on a predetermined second subcarrier within a predetermined first transmission area; a second stationary unit located near the first stationary unit for transmitting third data on the predetermined first subcarrier and the second data on the predetermined second subcarrier within a predetermined second transmission area, the predetermined first transmission area and the predetermined second transmission area being partially overlapping; and a mobile unit for maintaining communication among the mobile unit, the first stationary unit and the second stationary unit while the mobile unit is moving from the predetermined first transmission area to the predetermined second transmission area.

According to a fourth aspect of the current invention, a system for transmitting information via a common frequency carrier between a mobile unit and a set of stationary units, including: a first stationary unit for transmitting an information signal which is modulated by orthogonal frequency division multiplex modulation within a predetermined first transmission area; a second stationary unit for transmitting the information signal which is modulated by the orthogonal frequency division multiplex modulation within a predetermined second transmission area;, the predetermined first transmission area and the predetermined second transmission area being partially overlapping; and a mobile unit for maintaining communication among the mobile unit, the first stationary unit and the second stationary unit while the mobile unit is moving from the predetermined first transmission area to the predetermined transmission area.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 21 illustrates the prioritized segmented subcarrier transmission and reception.

FIG. 22 illustrates an exemplary improvement in efficiency for the use of a frequency band.

DETAILED DESCRIPTION OF THE PREFERRED EMBODIMENT(S)

Figure 1:
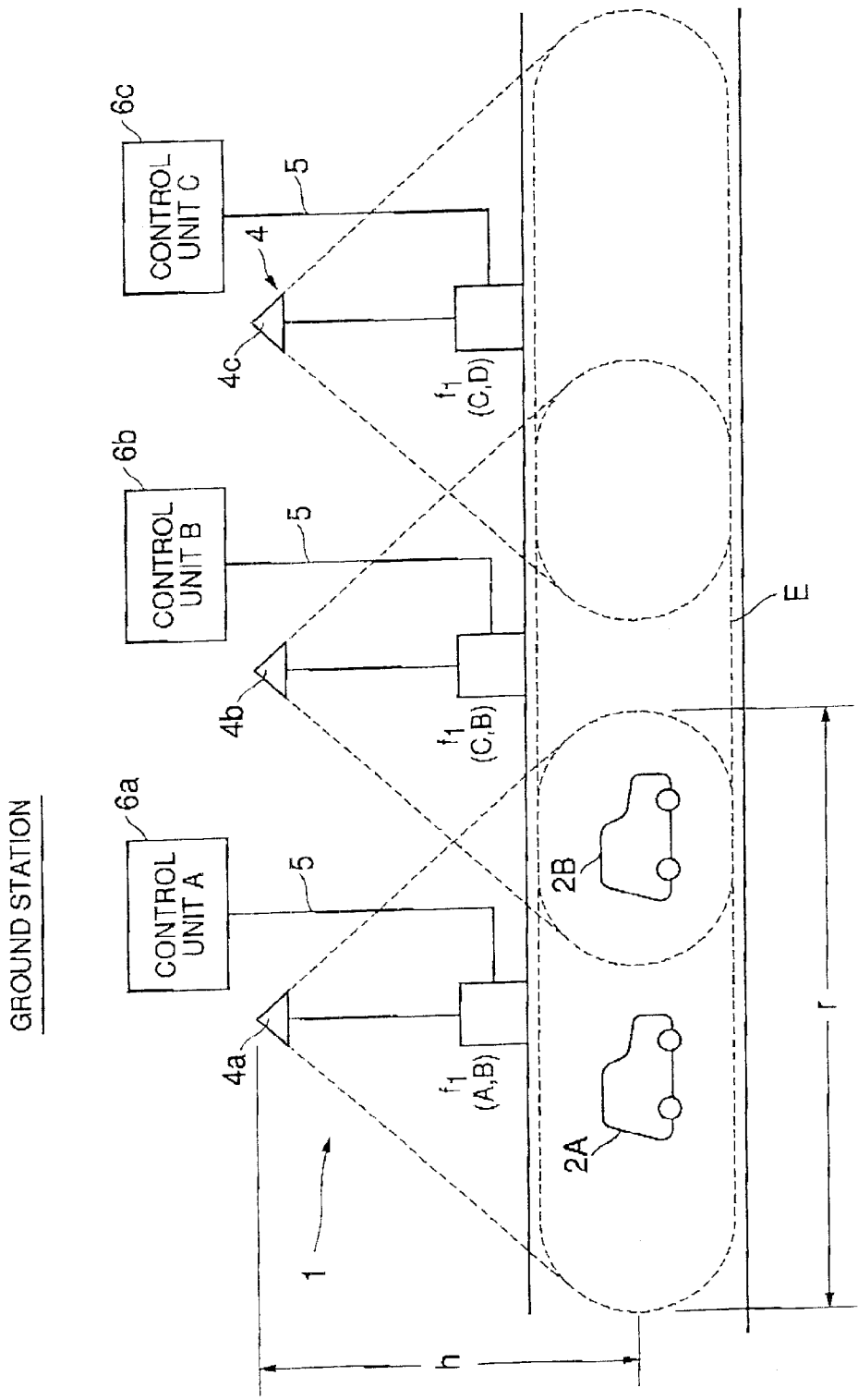
FIG. 1 is a block diagram illustrating one preferred embodiment of the road communication system according to the current invention.

Referring now to the drawings, wherein like reference numerals designate corresponding structures throughout the views, and referring in particular to FIG. 1, a block diagram illustrates one preferred embodiment of the road communication system according to the current invention. The preferred embodiment generally includes at least two ground stations or stationary units 1 and a mobile unit or car 2. As the car 2 travels along the road near the stationary units 1 as shown at positions 2A and 2B, there is constant communication between the car 2 and at least one of the stationary units 1. The content of the information or data possibly changes as the car 2 receives the data from a different stationary unit 1.

Still referring to FIG. 1, each stationary unit or cell 1 further includes a corresponding one of control units or control systems 6a–6c, a corresponding one of antennas 4a–4c and a coaxial cable 5. Each of the antennas 4a–4c has a predetermined transmission direction and a corresponding transmission area or cell area E where transmission reaches as indicated by dotted lines along a road way, and the adjacent transmission areas E are partially overlapping. In the preferred embodiment, each of the antennas 4a–4c has an approximate height of 10 meters, and the transmission area has a diameter or length r of about 100 meters along the roadway. The antennas 4a–4c transmit a radio signal at a common or single frequency within the above described transmission area E. For example, all of the antennas 4a–4c transmit 6 GHz signals. Thus, while a mobile unit or car 2 travels through the cell E, the car 2 receives the radio signal either from the front direction or from the rear direction. On the other hand, the car 2 receives the radio signal from approximately above when the car 2 is located below one of the antennas 4a–4c.

The coaxial cable 5 connects one of the antennas 4a–4c to a corresponding one of the control units 6a–6c. Each of the coaxial cables 5 includes a pair of a up-cable and a down-cable for transmitting information between each of the antennas 4a–4c and the corresponding control unit 6a–6c in a predetermined direction. In an alternative embodiment, an optical fiber cable is used in lieu of the coaxial cable 5. For the transmission of optical signals, a disclosure such as "Fiber/Radio For the Provision of Cordless/Mobile Elephony Services in The Access Network," Electron. Lett., Vol. 26, No. 24 (November 1990) is hereby incorporated by external reference.

Each of the control units 6a–6c outputs to the corresponding antennas 4a–4c via the coaxial cable 5 modulated signals including traffic data including traffic information ahead of the operators for facilitating the drive. In addition, the control units 6a–6c also receive from the car 2 information on a vehicle ID and road surface conditions. Sensors are mounted on the car 2 and collect the road surface conditions. The control units 6a–6c generate a predetermined radio signal containing the above described information such as (A,B), (C,B) or (C,D) and transmit the radio signal at a common frequency. Because of the common frequency signal, there is no need to change the frequency of an oscillator mounted on the car 2 as the car moves from one transmission area of the control unit 6a, 6b or 6c to that of another. Since the car 2 does not have to be equipped with an expensive and bulky oscillator for handling signals in multiple frequencies, the preferred embodiment can spare the additional cost and space for the oscillator in the car 2.

Figure 2:
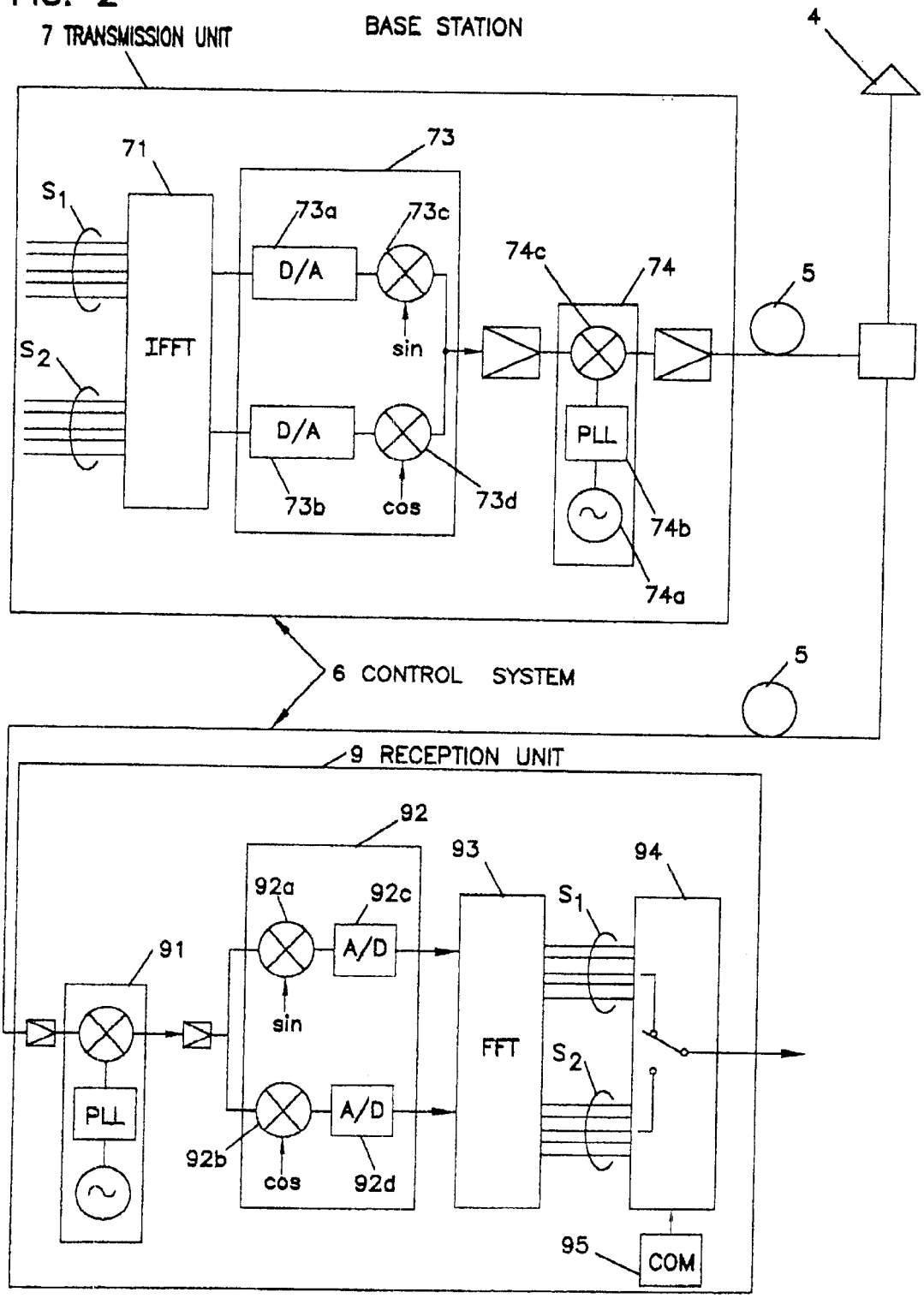
FIG. 2 is a block diagram illustrating components of the preferred embodiment of the control system according to the current invention.

Now referring to FIG. 2, a block diagram illustrates components of the preferred embodiment of the control system 6 according to the current invention. In general, the control system 6 includes a transmission unit 7 and a reception unit 9 and utilizes the orthogonal frequency division multiplex (OFDM) modulation technique which multiplexes a plurality of orthogonal frequency carriers for transmitting divided data. The transmission unit 7 generally includes an inverse Fourier function transformation (IFFT) circuit 71, a quadrature phase shift keying (QPSK) modulation circuit 73 and an up-converter 74. The IFFT circuit 71 performs the inverse Fourier transformation on each of parallel input signals S1 and S2 and serially translates the inversely transformed data back 5 to serial data. Finally, the IFFT circuit 71 time compresses the serial data and determines a guard time by placing a rear symbol in a forward position. The IFFT circuit 71 outputs two signals to the QPSK circuit 73. One signal has either 0° or 180° phase, and the other signal has either 90° or 270° phase.

Still referring to FIG. 2, the QPSK circuit 73 modulates output signals from the IFFT circuit 71 and the up-converter 74 generates a radio signal. The QPSK circuit 73 further includes a pair of digital-to-analog converters (D/A) 73a and 73b as well as a pair of multipliers 73c and 73d. The first D/A converter 73a outputs a signal to the multiplier 73c to multiply by a sine signal so as to produce an output signal having either 0° or 180° phase. Similarly, the second D/A converter 73b outputs a signal to the multiplier 73d to multiply by a cosine signal so as to produce an output signal having either 90° or 270° phase. The multiplied signals are added before being outputted. The up-converter 74 converts the output signal from the QPSK circuit 73 to a radio frequency. The up-converter 74 includes a local oscillator 74a, a Phase Locked Loop (PLL) 74b and a multiplier 74c. It is desired that the precision of the local oscillator 74a be the same order as a quotient of a speed of a car divided by the radio signal speed in view of a Doppler effect caused by the moving car. A commercially available oscillator can sufficiently match the above required precision. The oscillator 74a outputs a signal to the PLL 74b, and the output of the PLL 74b is multiplied with the output signal from the up-converter 74 before being outputted from the control unit 6. The output signal from the up-converter 74 is inputted into the antenna 4 via the cable 5 and is transmitted as a radio signal from the antenna 4.

In an alternative embodiment of the control system 6 according to the current invention, the control system 6 additionally includes an error correction coding circuit, a differential coding circuit and an interleaving circuit for interleaving time and or frequency.

In the alternative embodiment, circuits utilizing other modulation techniques such as quadrature amplitude modulation (QAM), binary phase shift keying (BPSK), and 8 phase shift keying (8PSK) are used in stead of the QPSK circuit 73. Furthermore, when an optical fiber is used as the cable 5, an electro-optical (E/O) converter is needed to convert the output electrical signal from the up-converter 74 into an optical signal before transmitting through the optical cable 5. An optic-electrical (O/E) converter is also needed to convert the optical signal back to an electrical signal before transmitted via the antenna 4.

In the above described preferred and alternative embodiments of the control system 6 according to the current invention, no drawing is provided to describe components in the control system 6 for receiving data from a car. However, the components in the control unit 6 for receiving data from the car 2 are substantially similar to the ones in the car 2 as will be described with respect to FIG. 4. Similarly, the components for transmitting the data in the car 2 are also substantially similar to the ones in the control unit 6.

Figure 3:
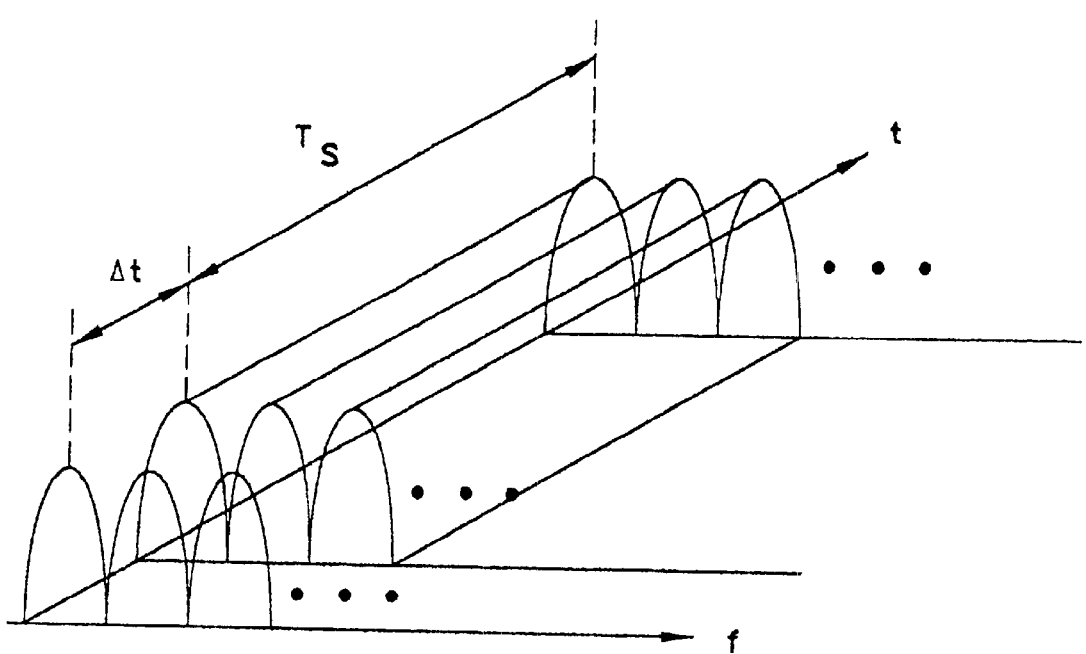
FIG. 3 is a graph with a frequency axis and a time axis illustrating symbol transmissions based upon the orthogonal frequency division multiplex (OFDM) modulation technique.

Now referring to FIG. 3, a graph with a frequency axis f and a time axis t illustrates symbol transmissions based upon the orthogonal frequency division multiplex (OFDM) modulation technique. The length of a valid symbol is expressed by Ts while that of a guard time is expressed by $\Delta t$. Thus, the time compression rate is expressed by $(Ts+\Delta t)/Ts$. In one preferred embodiment according to the current invention, the guard time $\Delta t$ is set to be longer than an amount of delay time due to multiple pass transmission. Because of the longer guard time $\Delta t$, it is possible to demodulate the received signal without any regard to a symbol overlap. The multiple pass delay time is determined either by measurements or calculations. For a transmission area having a length of 100 meters, the multiple pass delay time is expected to be approximately 500 nanoseconds. Assuming the data is transmitted from the car 2 to the control unit 6, the received signal is down-converted and decoded after detection. For a detection technique, a delay circuit performs a delay detection step by multiplying a current signal and a signal that is one bit before the current signal if phase modulation techniques such as QPSK, BPSK and 8PSK are used. On the other hand, if a phase modulation technique is QAM, detection is performed using a demodulation carrier. For delay detection, the data is differentially coded before transmission.

Figure 4:
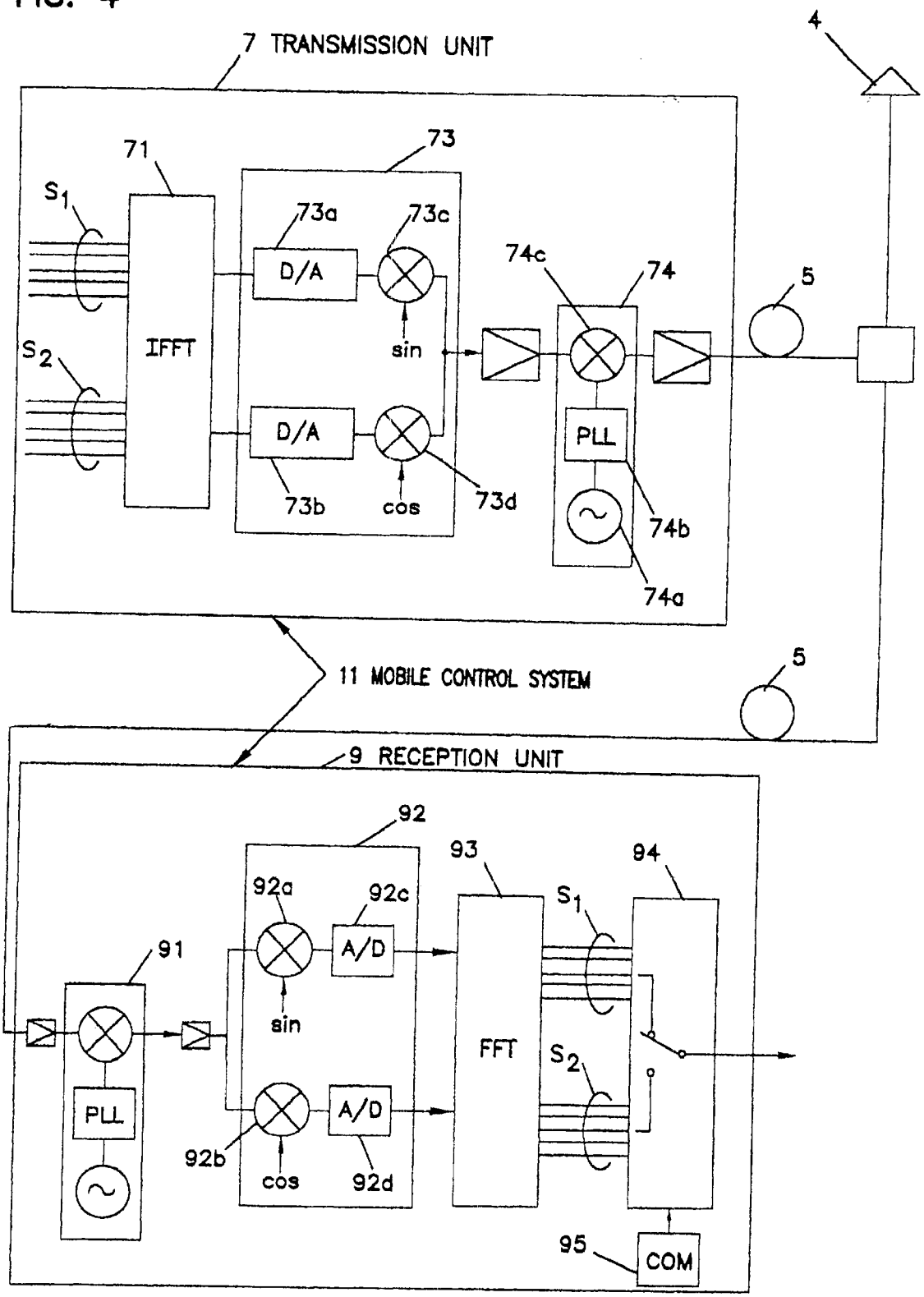
FIG. 4 is a block diagram illustrating components of the preferred embodiment of the mobile control system according to the current invention.

Now referring to FIG. 4, a block diagram illustrates components of the preferred embodiment of the mobile control system 11 according to the current invention. In general, the mobile control system 11 includes a transmission unit 7 and a reception unit 9. The reception unit 9 includes an antenna 4, a cable 5, a down-converter 91, a (QPSK) modulation circuit 92, a Fourier function transformation (FFT) circuit 93, a switch circuit 94 and a switch control circuit 95. The antenna 4 receives the radio signal transmitted from the control unit 6 and outputs to the down-converter 91. The down-converter 91 converts the received radio signal to an analog signal and outputs to the QPSK circuit 92. The QPSK circuit 92 includes a pair of multipliers 92a and 92b as well as a pair of analog to digital (A/D) converters 92c and 92d. The multipliers respectively multiply the analog signal by a sine signal and a cosine signal, and the outputs are respectively converted to a digital signal by the A/D converters 92c and 92d. The QPSK circuit 92 demodulates the digital signals and outputs the two demodulated digital signals to the FFT circuit 93, which performs the Fourier transformation on each of parallel input signals to generate output signals S1 and S2. The signals S1 and S2 each have a valid symbol length Ts. Finally, the switch control circuit 95 controls the switch circuit 94 to select one of the output signals S1 and S2. One implementation of the switch circuit 94 is a semi conductor. The switch control circuit 95 receives an input signal for selecting a signal as will be described with respect to FIG. 5. As described above, the transmission unit 7 of the mobile control system 11 is substantially identical to that of the control system 6 in FIG. 2.

In an alternative embodiment of the vehicle reception unit 9 according to the current invention, the following additional components are included: an error correction decoding circuit, a differential decoding circuit and a deinterleaving circuit for interleaving time and or frequency which respectively correspond to an error correction coding circuit, a differential coding circuit and a deinterleaving circuit for interleaving time and or frequency.

Figure 5:
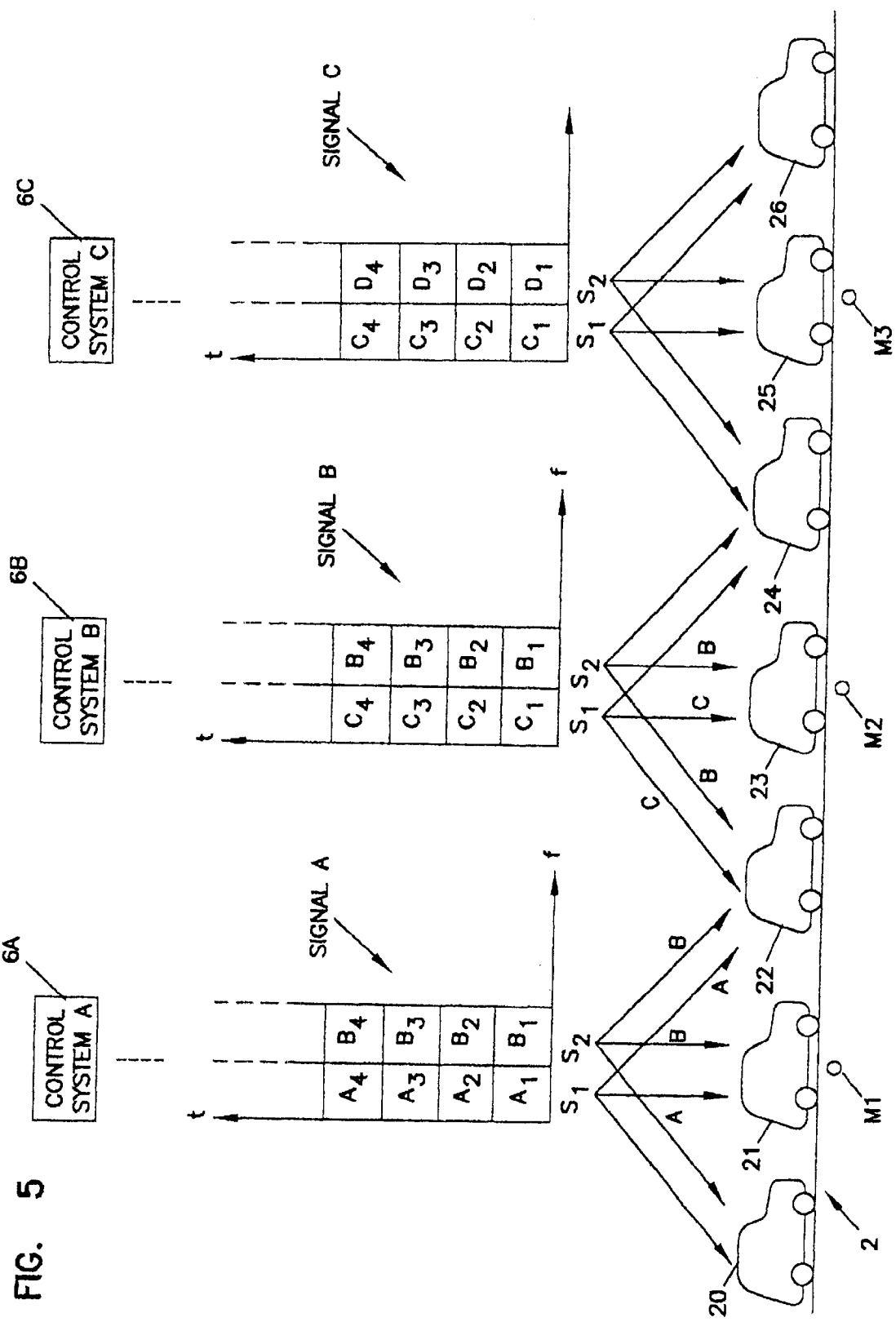
FIG. 5 is a block diagram illustrating one preferred embodiment of the signal reception from the stationary control units as the car moves from one position to another according to the current invention.

Referring to FIG. 5, a block diagram illustrates one preferred embodiment of the signal reception from the stationary units or control systems 6A through 6C as the car 2 moves from a position 21 to 23 according to the current invention. The stationary units 6A, 6B and 6C respectively transmit a first data signal A, a second data signal B and a third data signal C. Each of the data signals A, B and C are transmitted within a predetermined transmission area, and two adjacent transmission areas have a partially overlapping area. The stationary unit 6A transmits data signals A and B via two subcarriers S1 and S2. The first subcarrier S1 chronologically transmits data sets A1 through A4 in a serial manner. Concurrently with the first subcarrier transmission, the second subcarrier S2 chronologically transmits data sets B1 through B4 in a serial manner. The stationary unit 6A transmits the data sets A and B respectively via the subcarriers S1 and S2 within predetermined transmission areas approximately covering the vehicle positions 20 and 22. Similarly, the stationary unit 6B transmits data signals B and C via the same two subcarriers S1 and S2. The first subcarrier S1 chronologically transmits data sets C1 through C4 in a serial manner. Concurrently with the first subcarrier transmission, the second subcarrier S2 chronologically transmits data sets B1 through B4 in a serial manner. The stationary unit 6B transmits the data sets C and B respectively via the subcarriers S1 and S2 within predetermined transmission areas approximately covering the vehicle positions 22 and 24. Lastly, the stationary unit 6C transmits data signals C and D via the same two subcarriers S1 and S2. The first subcarrier S1 chronologically transmits data sets C1 through C4 in a serial manner. Concurrently with the first subcarrier transmission, the second subcarrier S2 chronologically transmits data sets A1 through A4 in a serial manner. The stationary unit 6C transmits the data sets C and D respectively via the subcarriers S1 and S2 within predetermined transmission areas approximately covering the vehicle positions 24 and 26.

Still referring to FIG. 5, depending upon a position of the car 2 with respect to the predetermined transmission areas, the car 2 receives different data from the stationary units 6A through 6C according to the current invention. For example, when the car 2 is located at an approximately central position 21 of the transmission area of the control unit 6A, the car 2 receives only data sets A and B respectively via subcarriers S1 and S2. A marker M1 is located at a predetermined position on or near the road surface with respect to the transmission area. The marker M1 is implemented as a magnetic marker, a color-coded reflector, and or a light-emitting source. The car 2 is equipped with a corresponding sensor to detect the marker M1. In this example, the marker M1 is located at an approximately central position in the transmission area, and before the car 2 approaches the marker M1, the reception of the data sets A and B is substantially stable. The car 2 selects the data signal containing the data A via the S1 subcarrier for providing a driver with information on traffic and road conditions. As the car 2 passes the marker M1, the detector on the car 2 detects the marker M1 and sends a detection signal to the above described switch control circuit 95 as shown in FIG. 4. The switch circuit 94 now selects the data signal containing the data B via the S2 subcarrier for providing a driver with information on traffic and road conditions.

After the car 2 passes the position marker M1, the car 2 moves towards a position 22 where the transmission areas of the control unit 6A and the control unit 6B partially overlap. As the car 2 moves towards an edge of the transmission area of the control unit 6A, the car 2 maintains the reception of the data A via subcarrier S1 and the data B via subcarrier S2 while it selects the data B for use. At the position 22, the car 2 now receives four data signals including the data A and B via subcarriers S1 and S2 from the stationary unit 6A and the data C and B via subcarriers S1 and S2 from the stationary unit 6B. Since the data set B is transmitted via the same subcarrier S2 near the position 22, it is possible for the car 2 to continuously receive the data set B in a stable manner as the car 2 crosses the transmission area boundary. The reception of the data set B is substantially free from the undesirable multiple pass fading effect. On the other hand, the subcarrier S1 from the stationary units 6A and 6B is also available to the car 2 near the transmission area boundary. Since two different sets of data A and C are transmitted via the subcarrier S1 near the cell boundary, the combination of the two data sets A and C yields nonsensical data after decoding and is not selected by the switch circuit 94.

As the car 2 moves away from the cell boundary position 22 towards a position 23 in the transmission area of the stationary unit 6B, the car 2 now receives the data set signals C and B via subcarriers S1 and S2. The data set B is continuously selected for use until the car 2 detects a marker M2 at the position 23. Upon detection of the marker M2, the car 2 now switches the use of the data set from B to C. While the car 2 maintains the reception of the data set signals A, B and C, the car 2 continuously selects the data set C through the cell boundary position 24 as the car 2 moves from the transmission area of the stationary unit 6B to that of the stationary unit 6C until the car 2 detects yet another marker M3. Upon detection of the marker M3, the car 2 again selects the alternate subcarrier S2 as the car moves away from a position 25 to a position 26. As described above, the car 2 seamlessly maintains the communication with a plurality of the stationary units 6A through 6C while it is moving through different transmission areas and their cell boundaries. The car 2 also seamlessly transmits data back to a corresponding one of the stationary units 6A through 6B. Thus, the above described preferred embodiment of the road side communication system according to the current invention seamlessly transmits and receives distinct or uniform data sets between the mobile unit and a series of the stationary units.

In an alternative embodiment of the road communication system according to the current invention, the stationary units 6A–6C transmit each of the two data signals with a detection code at a predetermined position within the data. The car 2 is equipped with a corresponding decoder for decoding the detection code as well as a comparator for comparing error rates in decoding the detection code. Based upon the comparison, the car 2 controls the switch to receive the data signal with the least error rate. Furthermore, in another alternative embodiment, a stationary unit transmits a plurality of data via more than two subcarriers and a car is equipped to select one of these sets of data at a time either by a system automatic selection or a driver-manual selection.

In yet another alternative embodiment of the road communication system according to the current invention, the markers M1 and M3 are each placed near a midpoint between two adjacent based stations. For example, the markers M1 is placed near a equidistant point from the control unit 6A and the control unit 6B. As the car 2 moves from the transmission area of the control unit 6A to that of the control unit 6B, the car 2 receives the same or different data from the new transmission source 6B. This switch is accomplished by the detection of the marker M1.

Figure 6:
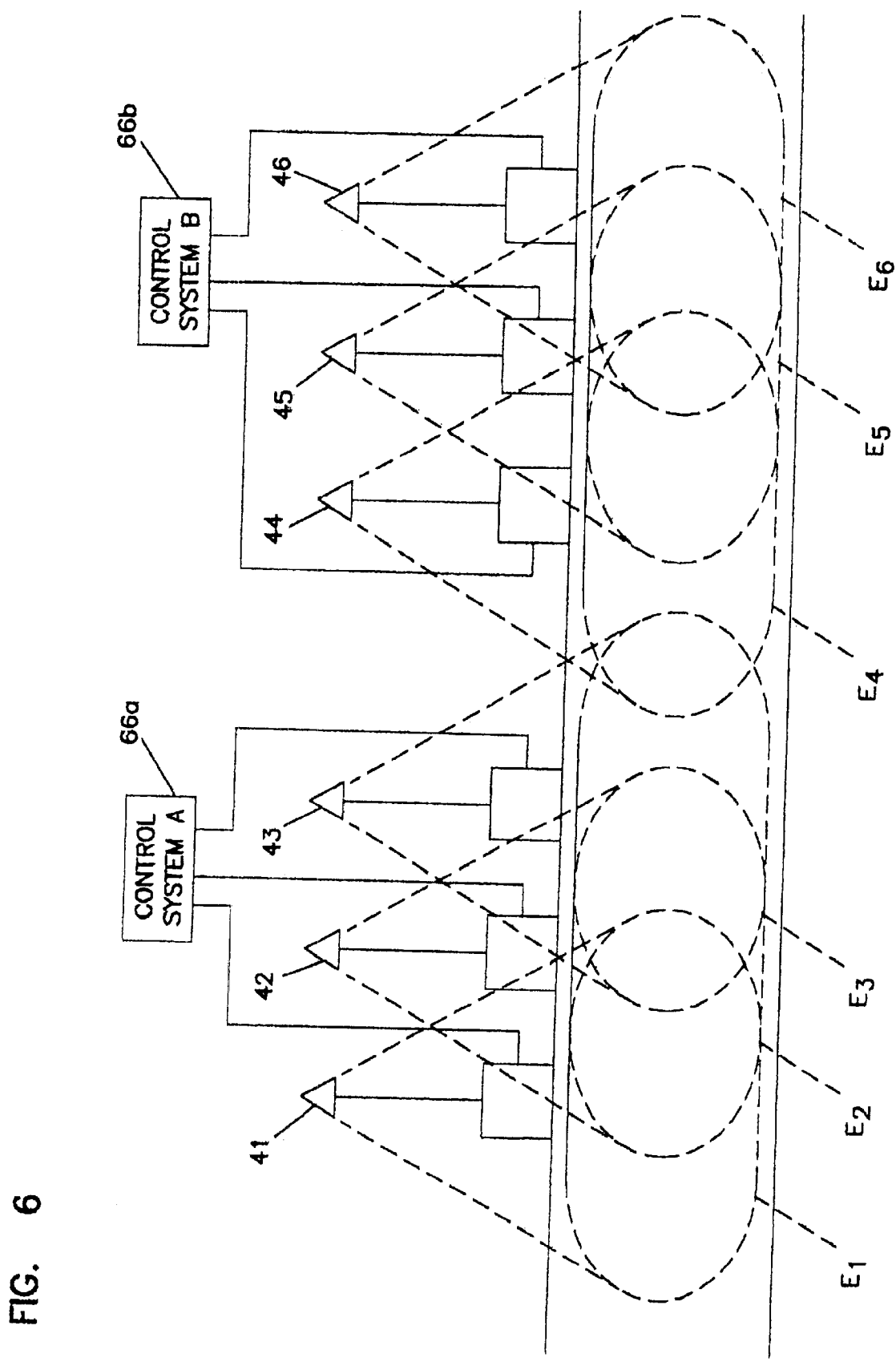
FIG. 6 is a block diagram illustrating a second preferred embodiment of the two-way road communication system according to the current invention.

Now referring to FIG. 6, a block diagram illustrates a second preferred embodiment of the two-way road communication system according to the current invention. The second preferred embodiment generally includes a predetermined number of control systems and a plurality of antennas that is connected to each of the stationary units. In the exemplary implementation of the second preferred embodiment, a first stationary system 66a is connected to a set of three antennas 41–43. Each of the antennas 41–43 has a corresponding predetermined transmission areas or cells E1–E3. A combined area of the transmission areas E1–E3 is approximately equivalent to the transmission area of the above described first control system 66a of the road communication system according to the current invention. Adjacent two of the cells E1–E3 have a partially overlapping area. Similarly, a second control system 66b is connected to a set of three antennas 44–46. Each of the antennas 44–46 has a corresponding predetermined transmission area or cell E4–E6. Adjacent two of the cells E4–E6 have a partially overlapping area. Furthermore, two adjacent cells E3 and E4 are also partially overlapped. Since the transmission area of the first preferred embodiment is divided into a plurality of smaller sub transmission areas or cells E1–E6, the power consumption of each of the antennas 41–46 has been reduced. The above described second preferred embodiment of the road side communication system according to the current invention also seamlessly transmits and receives distinct or uniform data sets between the mobile unit and a series of the stationary units.

Figure 7:
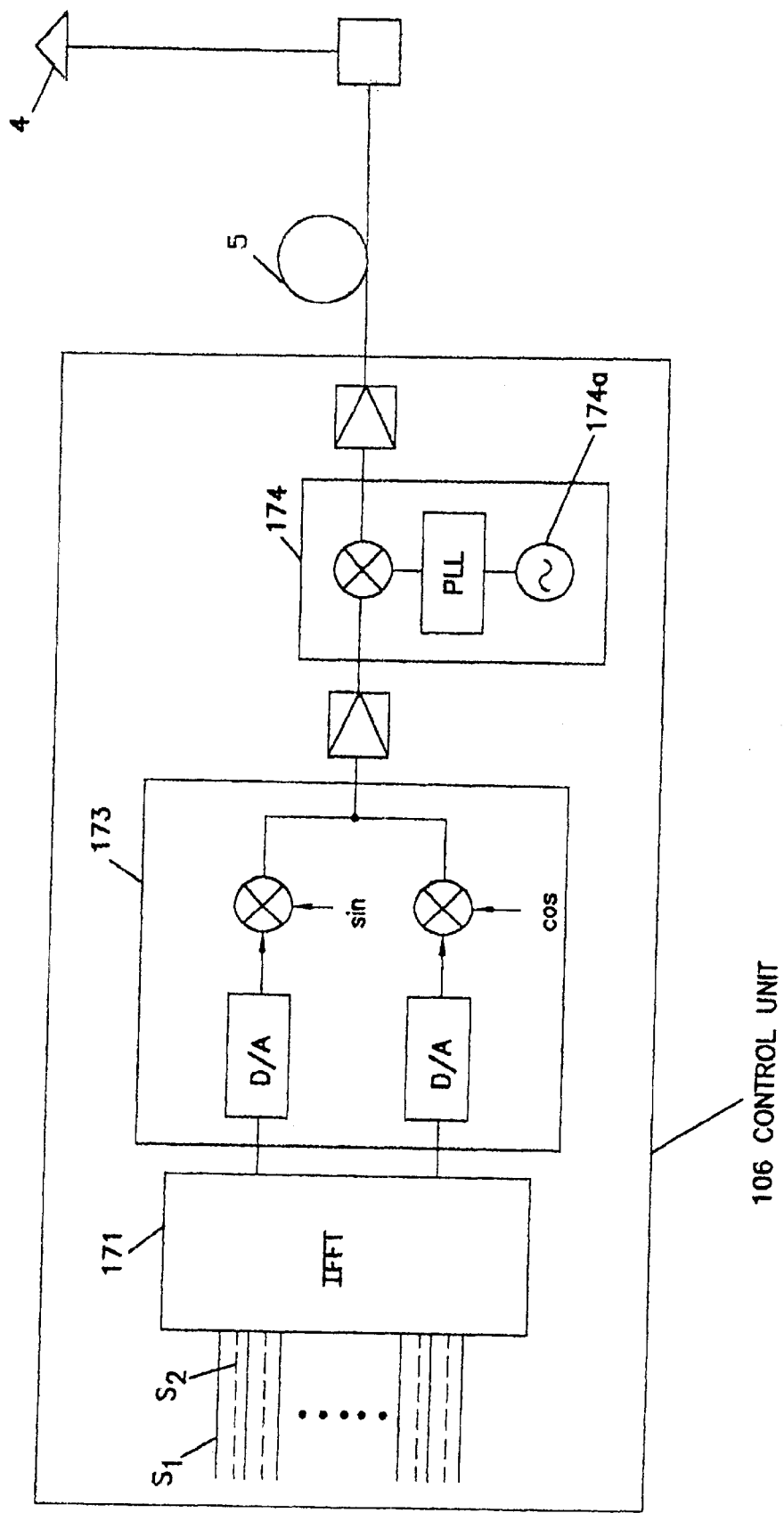
FIG. 7 is a block diagram illustrating a third preferred embodiment of the stationary control unit or the ground station used in the two-way road communication system according to the current invention.

Now referring to FIG. 7, a block diagram illustrates a third preferred embodiment of the stationary unit or the ground station used in the two-way road communication system according to the current invention. The third preferred embodiment of the control unit 106 generally includes an inverse Fourier function transformation (IFFT) circuit 171, a (QPSK) modulation circuit 173 and an up-converter 174 which is connected to an antenna 4 via a cable 5. Since these components of the third preferred embodiment are substantially similar to those of the preferred embodiment as shown in FIG. 2, the corresponding descriptions are not repeated here and are hereby incorporated from the above. The IFFT circuit 171 receives at least two types of digital signals S1 and S2, and the two digital signals S1 and S2 are alternately arranged as shown in the solid and dotted lines. As the result of the sequentially arranged input digital signals S1 and S2, the control unit 106 transmits the antenna 4 a radio signal having an alternate arrangement of a first subcarrier carrying a data set A and a second subcarrier carrying a data set B along the frequency axis in a frequency spectrum. Since a reception side can discard one of the two alternately arranged radio signals, an interval between the two subcarriers is practically as twice as that of non-alternate arrangement.

Still referring to FIG. 7, for the use of multiple-carrier transmission techniques such as OFDM in the third preferred embodiment of the stationary unit in the two-way road communication system according to the current invention, an additional circuit is necessary. If each subcarrier is not synchronized, the performance level is lowered. In particular, if the system is used for a high-speed mobile communication, due a shift caused by the Doppler effect, it becomes harder to synchronize the subcarriers. To correctly synchronize the subcarriers, an automatic frequency control (AFC) circuit becomes necessary. When two adjacent subcarriers have a narrow frequency distance, the AFC circuit generally becomes complex since it has to be able to determine whether the corrected subcarrier belongs to a higher frequency side or a lower frequency side. To avoid a complex AFC circuit, the control unit 107 is designed to have a sufficiently large distance between the subcarrier intervals. However, this design may require the subcarrier interval to be larger than the frequency interval that data needs. To substantially reduce the above wasteful design, subcarriers are interleaved with each other to allow a narrow subcarrier interval. The interleaved arrangement also simplifies hardware and certain determination processes in the AFC circuit so that a frequency band is more productively used.

Figure 8:
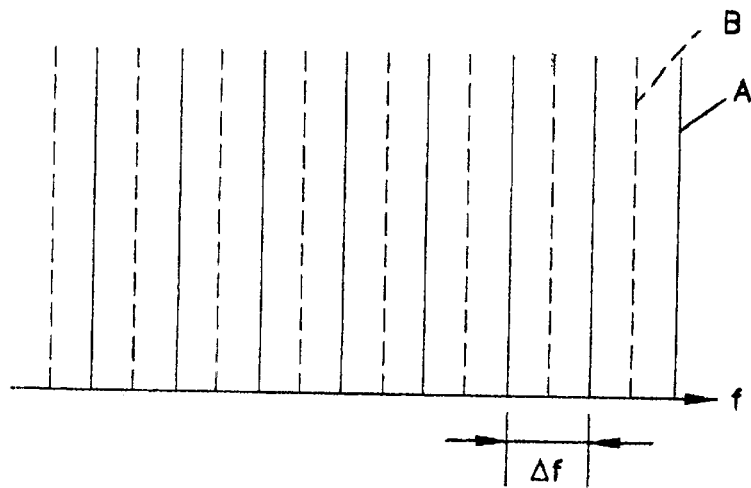
FIG. 8 is a diagram illustrating an exemplary radio signal that is transmitted by the third preferred embodiment of the stationary unit according to the current invention.

Now referring to FIG. 8, a diagram illustrates an exemplary radio signal that is transmitted by the above described third preferred embodiment of the stationary unit according to the current invention. As the result of the sequentially arranged input digital signals S1 and S2, the control unit 106 transmits via the antenna 4 a radio signal having an alternate arrangement of a first subcarrier carrying a data set A and a second subcarrier carrying a data set B along the frequency axis in a frequency spectrum. The two digital signals S1 and S2 are alternately arranged as shown in solid and dotted lines. Because of this alternate arrangement, a frequency interval Af between the two subcarriers as shown in two solid lines is practically as twice as that of non-alternate arrangement.

Figure 9A:
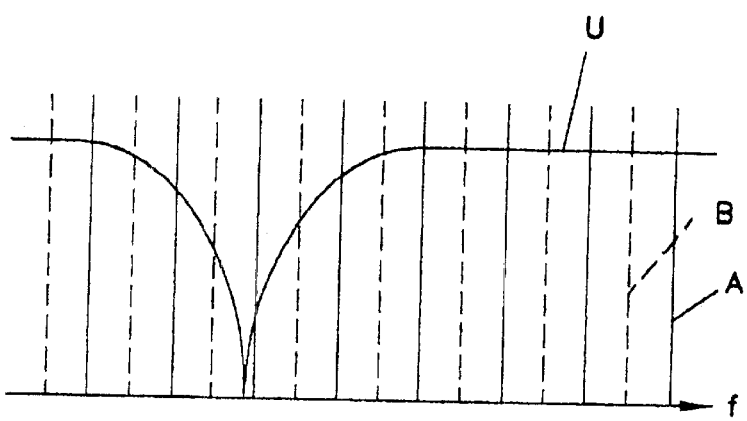
FIGS. 9A and 9B show the frequency selective fading characteristic in response to an amplitude change U along the frequency axis.
Figure 9B:
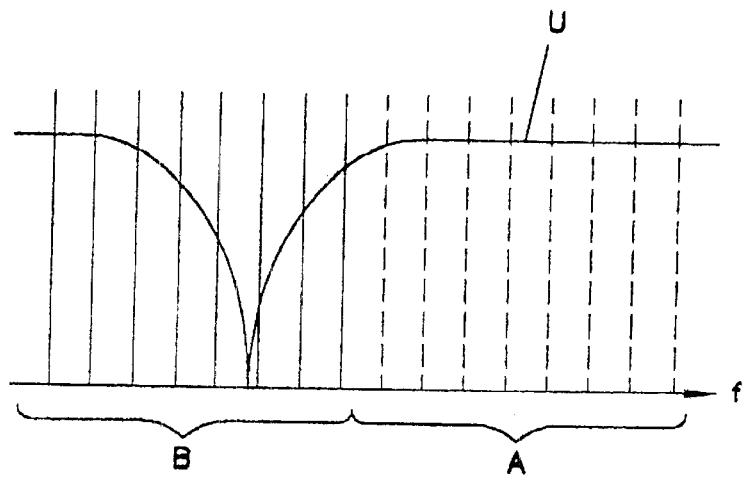

FIGS. 9A and 9B diagrammatically illustrate improvement of the alternate arrangement against frequency selective fading over the non-alternate arrangement. FIGS. 9A and 9B show the frequency selective fading characteristic in response to an amplitude change U along the frequency axis. FIG. 9A indicates that subcarriers A and B are interleaved or alternately arranged while FIG. 9B indicates that subcarriers A and B are divided into two blocks along the frequency axis. When the frequency selective fading U occurs, since a great majority of subcarriers A in use for communication are substantially affected as shown in FIG. 9B, communication interference is observed. On the other hand, when the frequency selective fading U similarly occurs, since only a small portion of subcarriers A or B in use for communication is affected as shown in FIG. 9A, communication interference is unlikely to be observed. As a result, the preferred embodiment as illustrated in FIG. 9A is a road communication system that is resilient against the communication interference caused by the undesirable fading effect.

Figure 10:
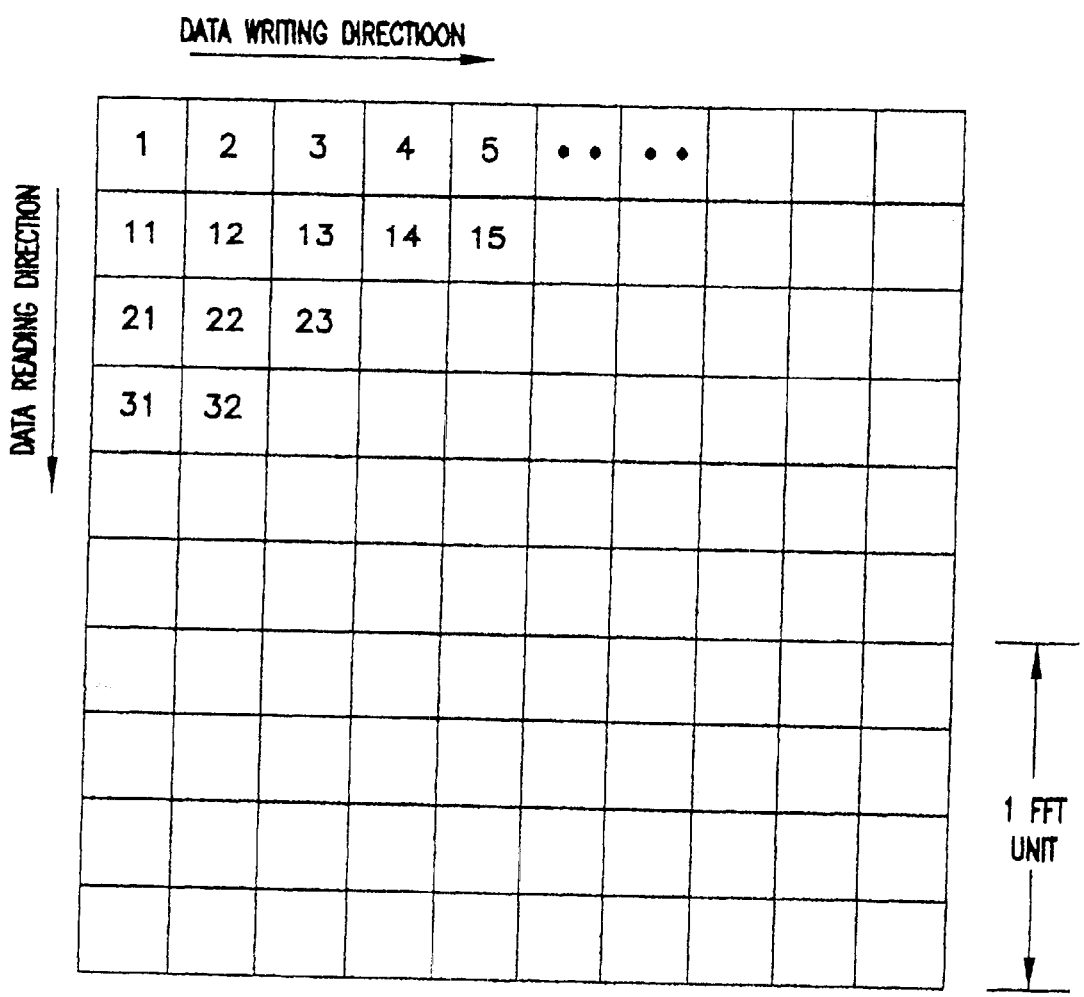
FIG. 10 is a table illustrating a buffer image used for error correction coding and interleaving a single set of data on subcarriers.

Now referring to FIG. 10, a table illustrates a buffer image used for error correction coding and interleaving a single set of data on subcarriers. In a radio signal to be transmitted, subcarriers are arranged not only along the frequency axis but also along the time axis. Another preferred embodiment of the road communication system according to the current invention transmits the above dual interleaved subcarrier signal. To generate the above radio signal, the preferred embodiment chronologically rearrange the data before performing an inverse Fourier function transformation. In the buffer image, each box signifies a predetermined data unit such as 8, 16 and 32 bits and each box is serially numbered. Data is written to the buffer in a horizontal direction in the order of boxes 1, 2, 3, 4, 5 . . . 11, 12, . . . At the same time, detection bits used for error correction are also written. Later, the data is read from the buffer in a vertical direction in the order of boxes 1, 11, 21, 31 . . . 2, 12, 22 . . . 1 FFT unit is determined as an amount of data used in each an inverse Fourier function transformation step or a Fourier function transformation step based upon OFDM. Although the FFT unit may be a data unit, the FFT unit is generally a multiple of the data units. In the example shown in the above buffer image, four data units are defined to be a single FFT unit. Thus, four data units or a single FFT unit is read at a time in the vertical direction, and these four data units are applied to a subcarrier. In general, one data unit is not applied to one subcarrier wave. In stead, each bit of one data unit is generally applied to one subcarrier wave. However, depending upon a modulation technique, a number of bits per one subcarrier wave varies. For example, the QPSK technique utilizes that two data bits are applied to one subcarrier wave. Based upon the above described interleaving technique, the data that are continuous upon writing is distributed over time and frequency. Because of the above distribution, even if the data is not correctly transmitted over a certain time range or a frequency range, the data is substantially reproduced at the receiving end.

Figure 11:
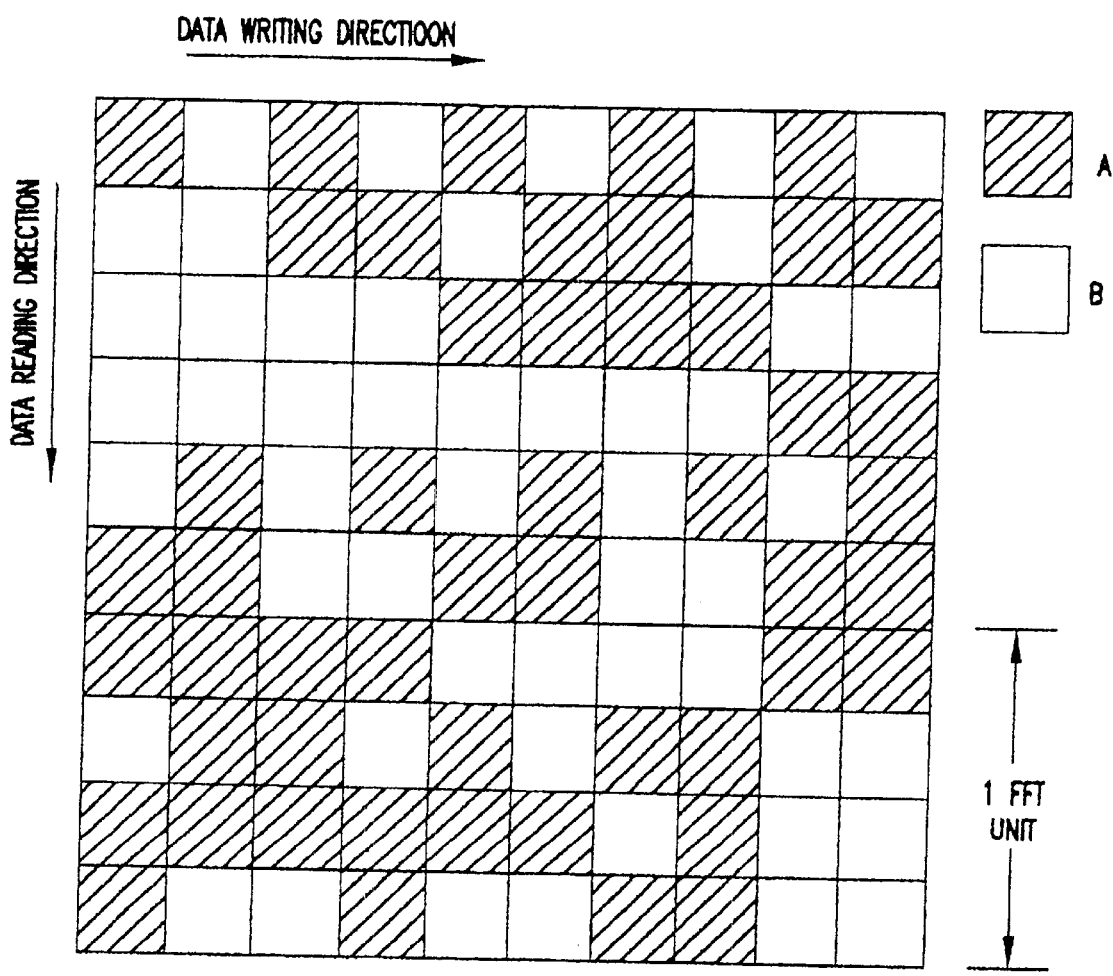
FIG. 11 is a table illustrating a buffer image used for error correction coding and interleaving two sets of data A and B on subcarriers.

Now referring to FIG. 11, a table illustrates a buffer image used for error correction coding and interleaving two sets of data A and B on subcarriers. In a radio signal to be transmitted, subcarriers are arranged not only along the frequency axis but also along the time axis. Yet another preferred embodiment of the road communication system according to the current invention transmits the above dual interleaved subcarrier signal indicative of a plurality of sets of data. In general, a transmission side and a reception side must share a common interleaving or distribution technique of multiple sets of data over subcarriers in order to communicate with each other. In the buffer image, each box signifies a predetermined data unit. Four data units are defined to be a single FFT unit. The horizontal direction is a data writing direction, and the vertical direction is a data reading direction. Furthermore, the buffer image shows that a first set of data A is cross hatched while a second set of data B is blank. As described above, four data units or one FFT unit is read at a time in the vertical direction, and these four data units are applied to a subcarrier. The above illustrated distribution is not only based upon a data unit but also based upon bits.

Figure 12:
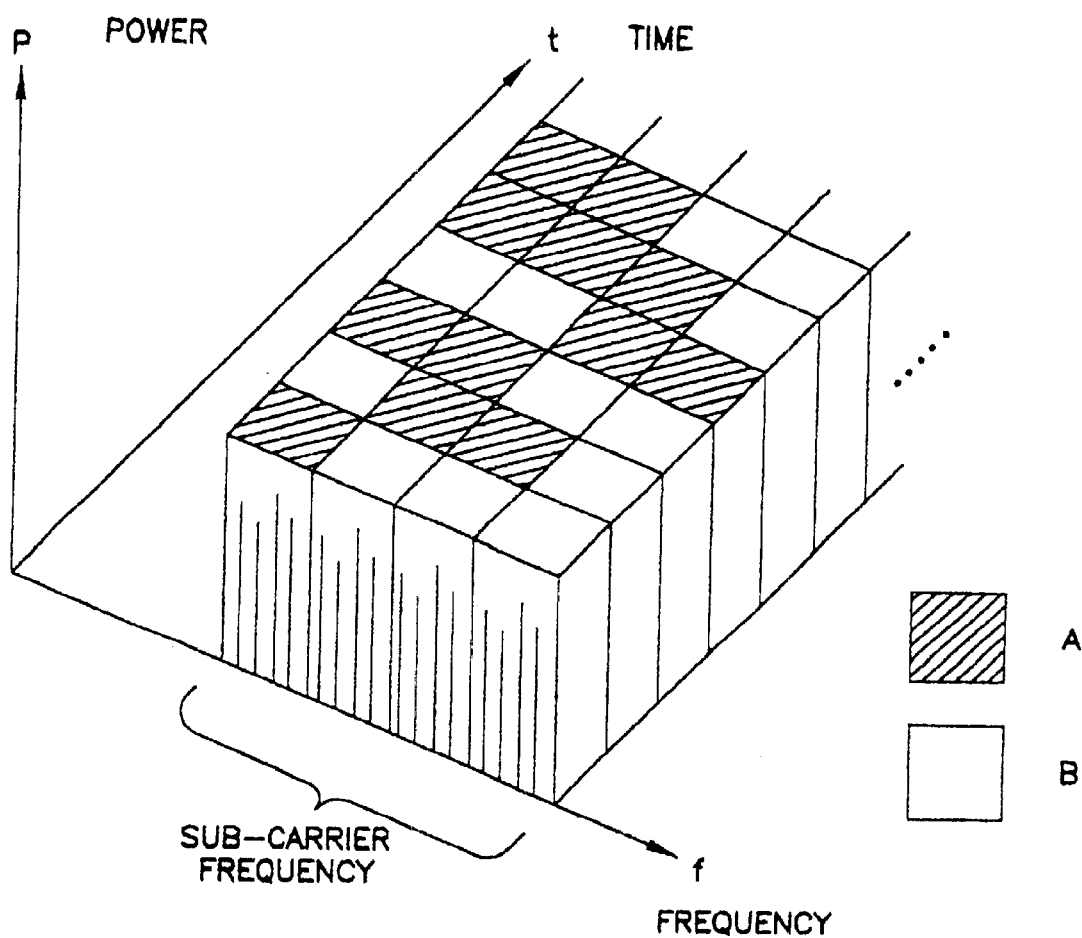
FIG. 12 is a portion of a three-dimensional image of transmission data is mapped onto subcarrier and is illustrated along the time axis, the frequency axis and the power axis.

Now referring to FIG. 12, a portion of a three-dimensional image of transmission data is mapped onto subcarriers and is illustrated along the time axis, the frequency axis and the power axis, and the buffer image contains the two sets of data A and B after the inverse Fourier function transformation is performed. The image shows that a first set of data A is cross hatched while a second set of data B is blank. At a given time, the data sets A and B are distributed in a certain pattern along the frequency axis. At a given frequency, the data sets A and B are distributed in another certain pattern along the time axis. Due to these data distributions, the data sets A and B are meshed along the time and frequency axes, and the effects of the time diversity and the frequency diversity are multiplied.

Figure 13:
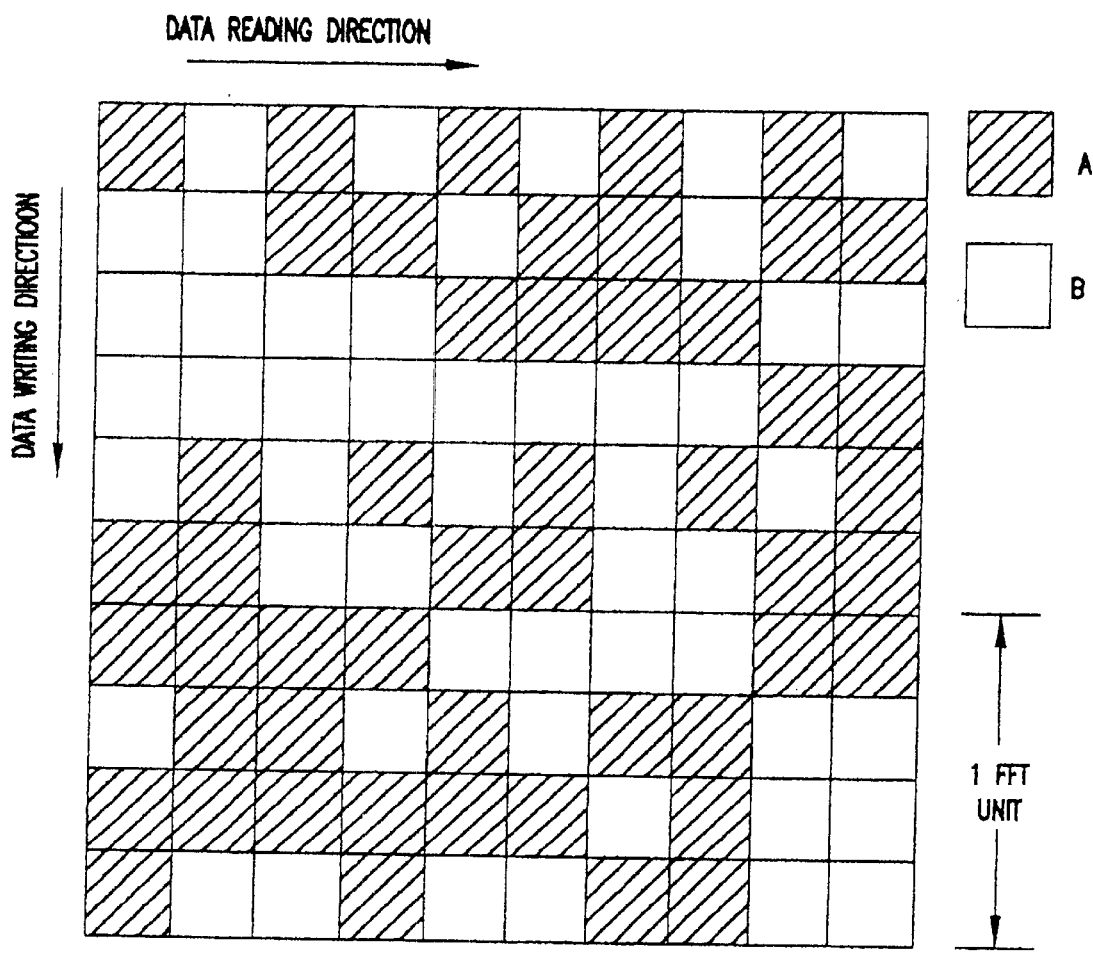
FIG. 13 is a table illustrating a buffer image used for de-interleaving the already interleaved two sets of data A and B.

Now referring to FIG. 13, a table illustrates a transmission data image used for de-interleaving the already interleaved two sets of data A and B. A preferred embodiment of the road communication system according to the current invention receives the above described dual interleaved subcarrier signal indicative of a plurality of sets of data. In the buffer image, each box signifies a predetermined data unit. Four data units are defined to be a single FFT unit. In contrast to the buffer image of FIG. 11 used for interleaving, the vertical direction is a data writing direction, and the horizontal direction is a data reading direction. Furthermore, the buffer image shows that a first set of data A is cross hatched while a second set of data B is blank. As described above, four data units or one FFT unit is read at a time in the horizontal direction, and a Fourier function transformation is performed on these four data units. Then, the data is de-interleaved, and the distributed data sets are rearranged to separate the two data sets A and B based upon a predetermined reverse distribution algorithm. Finally, one of the separated data sets A and B is selected by a switch. As described above, since the preferred embodiment according to the current invention arranges the data sets A and B based upon a predetermined pattern along the time axis and the frequency axis, both time and frequency diversities are gained. Furthermore, the correction capability of error correction coding is efficiently utilized to provide high quality communication data.

Figure 14:
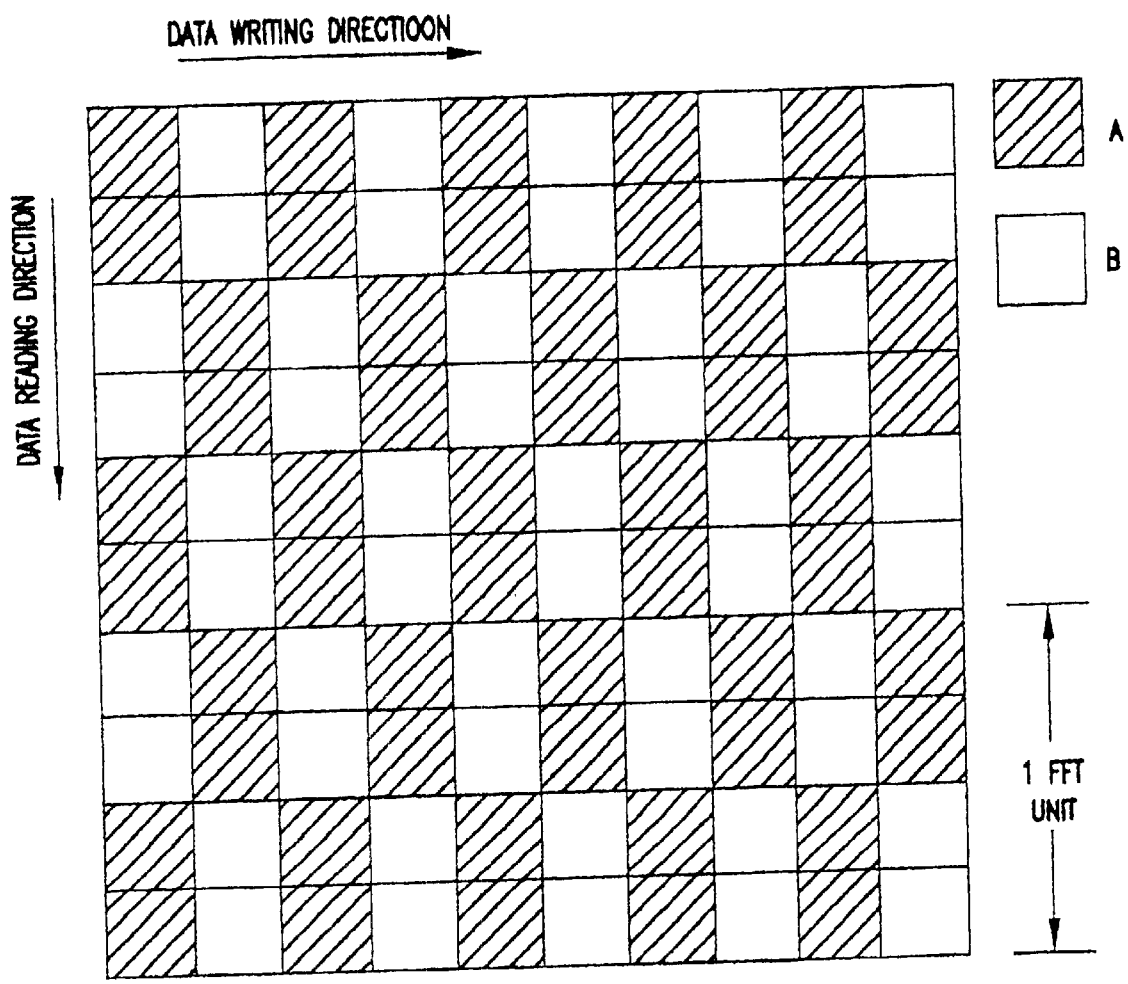
FIG. 14 is a table illustrating an exemplary buffer image of two sets of distributed data A and B based upon a predetermined algorithm.

Now referring to FIG. 14, a table illustrates an exemplary transmission data image of two sets of distributed data A and B based upon a predetermined algorithm. Each box signifies a predetermined data unit. Four data units are defined to be a single FFT unit. The vertical direction is a data reading direction, and the horizontal direction is a data writing direction. Furthermore, the buffer image shows that a first set of data A is cross hatched while a second set of data B is blank. The predetermined algorithm utilizes the FFT unit as a repetition cycle of distributing data sets A and B.

Figure 15:
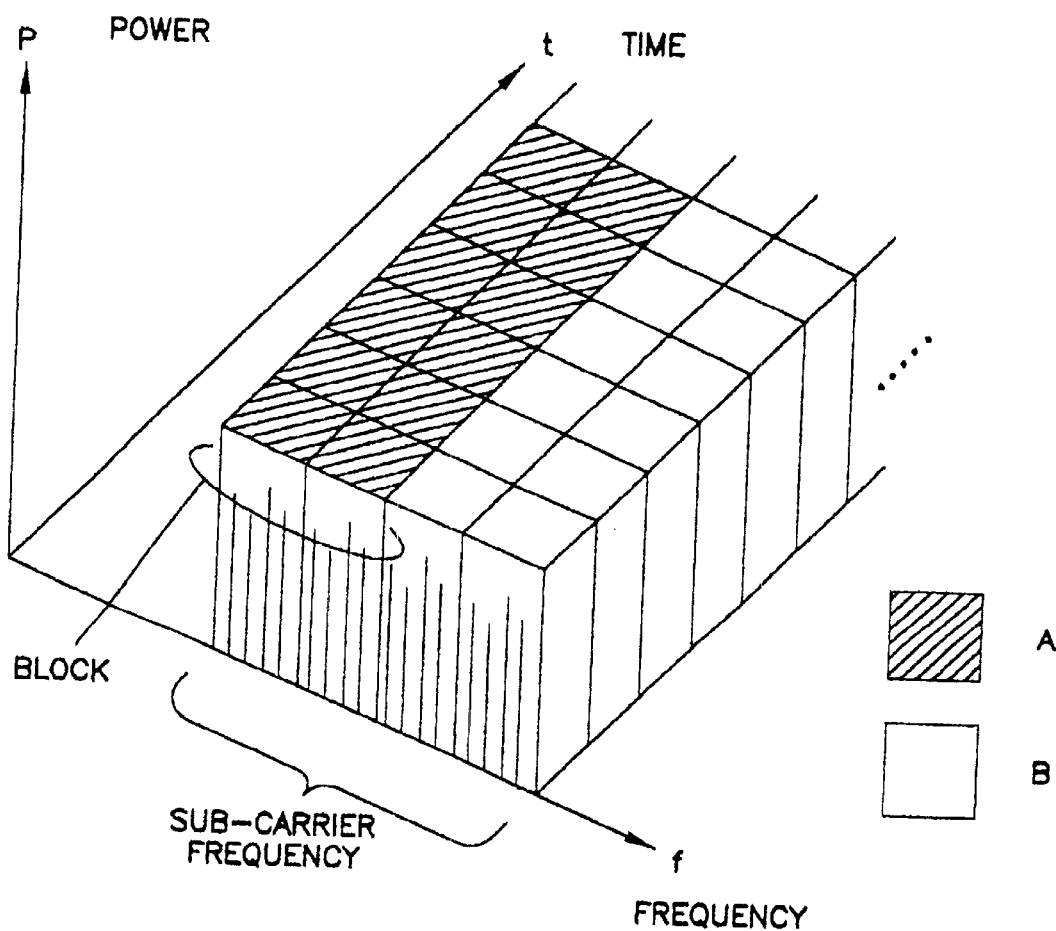
FIG. 15 is a portion of another three-dimensional image of transmission data mapped onto subcarrier and is illustrated along the time axis, the frequency axis and the power axis.

Now referring to FIG. 15, a portion of a three-dimensional image of transmission data is mapped onto subcarriers and is illustrated along the time axis, the frequency axis and the power axis, and the buffer image contains the two sets of data A and B after an inverse Fourier function transformation is performed. The image shows that a first set of data A is cross hatched while a second set of data B is blank. The data sets A and B are divided into two subcarrier frequency blocks along the frequency axis. The block divisional pattern is constant over time. Although only two data sets are used in the above examples, any integer number of data sets is used in alternative embodiments.

Figure 16:
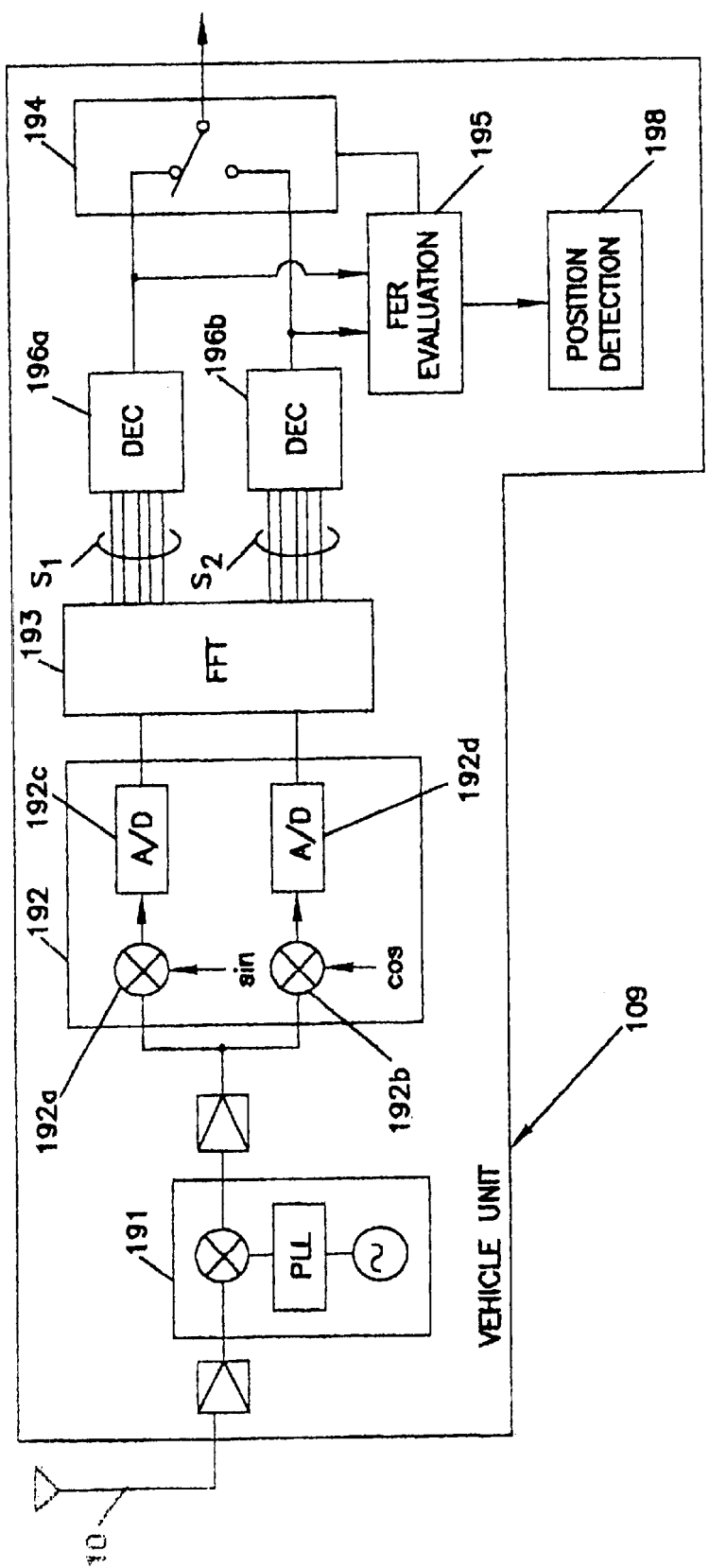
FIG. 16 is a block diagram illustrating components of a preferred embodiment of the vehicle reception unit according to the current invention.

FIG. 16 is a block diagram illustrating components of a preferred embodiment of the vehicle reception unit 109 according to the current invention. The vehicle reception unit 109 includes an antenna 10, a down-converter 191, a (QPSK) modulation circuit 192, a Fourier function transformation (FFT) circuit 193, a pair of decoders 196a, 196b, a switch circuit 194, a Frame Error Ratio (FER) evaluation circuit 195 and a position detection unit 198. The antenna 10 receives the radio signal transmitted from the control unit 6 and outputs to the down-converter 191. The down-converter 191 converts the received radio signal to an analog signal and outputs to the QPSK circuit 192. The QPSK circuit 192 includes a pair of multipliers 192a and 192b as well as a pair of analog to digital (A/D) converters 192c and 192d. The multipliers respectively multiply the analog signal by a sine signal and a cosine signal, and the outputs are respectively converted to a digital signal by the A/D converters 192c and 192d. The QPSK circuit 192 demodulates the digital signals and outputs the two demodulated digital signals to the FFT circuit 193, which performs the Fourier transformation on each of parallel input signals to generate output signals S1 and S2. The signals S1 and S2 each have a valid symbol length Ts. Finally, the FER evaluation circuit 195 controls the switch circuit 194 to select one of the output signals S1 and S2 for providing information including traffic and road conditions. One implementation of the switch circuit 194 is a semi conductor.

In an alternative embodiment of the vehicle reception unit 109 according to the current invention, the following additional components are included: an error correction decoding circuit, a differential decoding circuit and an interleaving circuit for deinterleaving time and or frequency which respectively correspond to an error correction coding circuit, a differential coding circuit and a deinterleaving circuit for deinterleaving time and or frequency.

Figure 17:
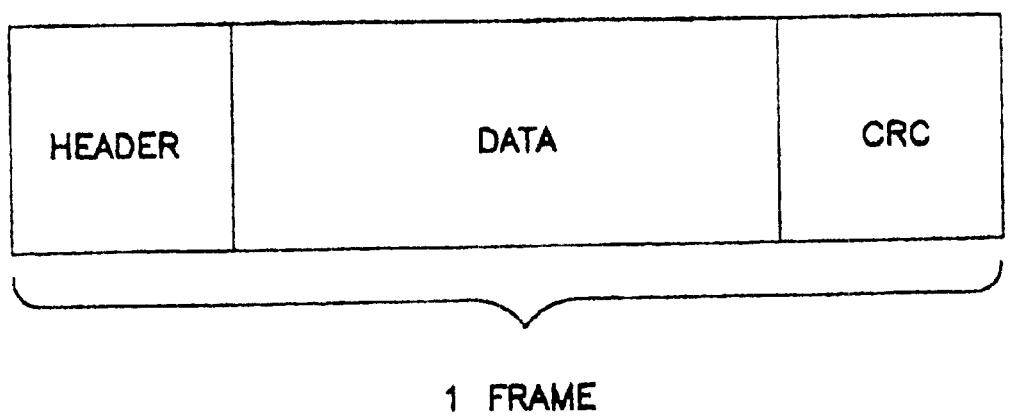
FIG. 17 is a diagram illustrating components in a frame in a transmission signal.

Referring to FIG. 17, a diagram illustrates components in a frame in a transmission signal. Each frame includes a header area, a data area and a cyclic redundancy check (CRC) area. A redundant code such as a CRC code is placed at a predetermined position in the frame for evaluating the reception condition, and the frame is transmitted via subcarriers S1 and S2. In the decoded data, an error occurrence rate for frames is determined by reading the relevant code. The frame error occurrence rate is defined to be M1/(M1+M2) where M1 is a number of frames that is correctly received over a predetermined period of time while M2 is a number of frames that is incorrectly received over the same predetermined period of time. The subcarrier with the least error occurrence rate is selected. This selection is performed by the frame error rate (FER) evaluation circuit 195 in the above described vehicle reception unit 109 according to the current invention. Furthermore, the FER evaluation circuit 195 outputs the larger error frame occurrence rate to the position detection unit 198.

Figure 18:
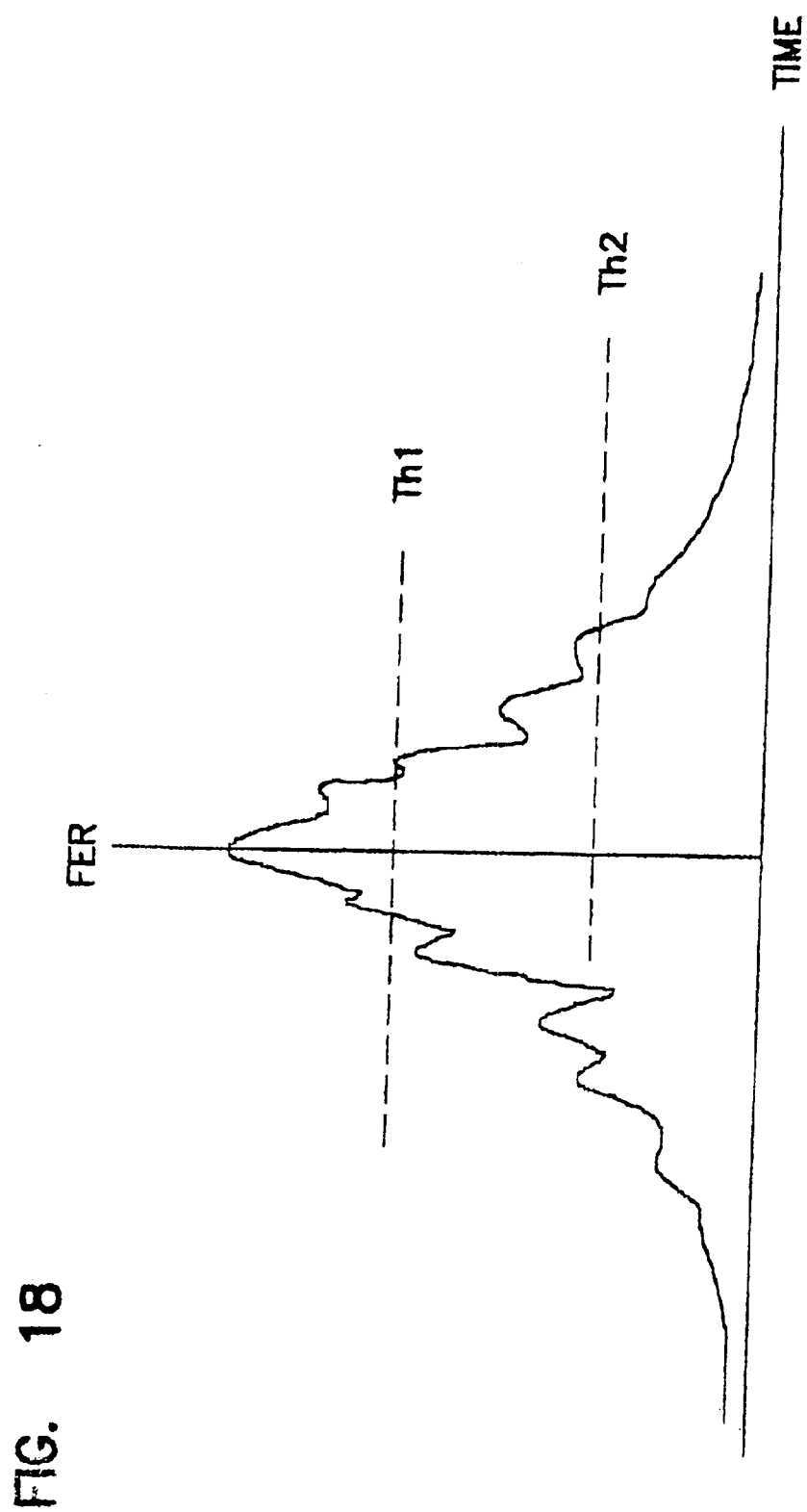
FIG. 18 is a graph illustrating a change in the error frame occurrence rate over time with respect to a pair of predetermined threshold values Th1 and Th2.

Now referring to FIG. 18, in response to the larger error frame occurrence rate from the FER evaluation circuit 195, the position detection unit 198 determines a relative position by comparing a change in the error frame occurrence rate over time to a pair of predetermined threshold values Th1 and Th2. The position detection unit 198 indicates that the car or mobile unit 2 is near a cell boundary or an overlapping area of adjacent transmission areas when the error frame occurrence rate reaches beyond the first predetermined value Th1. On the other hand, the position detection unit 198 indicates that the car or mobile unit 2 is out of a cell boundary area and within a transmission area when the error frame occurrence rate reaches below the second predetermined value Th2.

Figure 19:
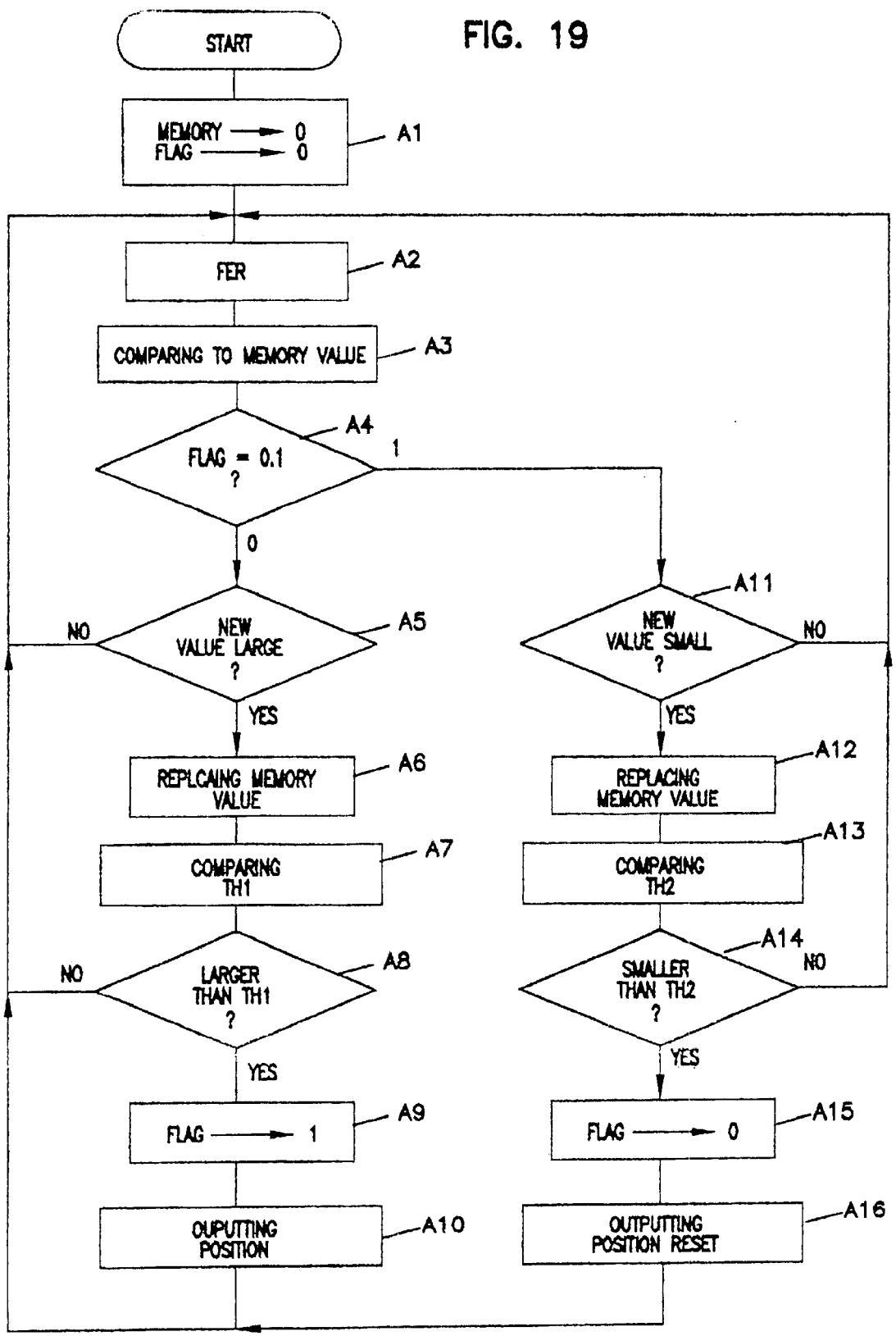
FIG. 19 is a flow chart illustrating acts involved in a preferred process of detecting a relative position according to the current invention.

FIG. 19 is a flow chart illustrating acts involved in a preferred process of detecting a relative position according to the current invention. These acts are generally performed within the position detection unit 198. After both a memory and a flag are initialized to zeroes in act A1, a frame error occurrence rate is periodically received in act A2. The frame error occurrence rate is compared to a previously stored frame error occurrence rate in the memory in act A3. If the flag value is 0 in act A4 but the new frame error occurrence rate is not larger than the previously stored frame error occurrence rate in act A5, the preferred process returns to the act A2. On the other hand, if the flag value is 0 in act A4 and the new frame error occurrence rate is larger than the previously stored frame error occurrence rate in act A5, the memory is rewritten with the new frame error occurrence rate in act A6. In act 7, the frame error occurrence rate in the memory is compared to a predetermined first threshold value Th1. If the frame error occurrence rate in the memory is not larger than the first predetermined threshold value Th1 in act A8, the preferred process returns to the act A2. If the frame error occurrence rate in the memory is larger than the first predetermined threshold value Th1 in act A8, the flag is now set to 1 in act A9. The position is outputted in act A10, and the preferred process returns to the act A2.

Still referring to FIG. 19, if the flag value is 1 in act A4 but the new frame error occurrence rate is not smaller than the previously stored frame error occurrence rate in act A11, the preferred process returns to the act A2. On the other hand, if the flag value is 1 in act A4 and the new frame error occurrence rate is smaller than the previously stored frame error occurrence rate in act A11, the memory is rewritten with the new frame error occurrence rate in act A12. In act A13, the frame error occurrence rate in the memory is compared to a predetermined second threshold value Th2. If the frame error occurrence rate in the memory is not smaller than the second predetermined threshold value Th2 in act A14, the preferred process returns to the act A2. On the other hand, if the frame error occurrence rate in the memory is smaller than the second predetermined threshold value Th2 in act A14, the flag is now set to 0 in act A15. The position is outputted in act A16, and the preferred process returns to the act A2.

Figure 20A:
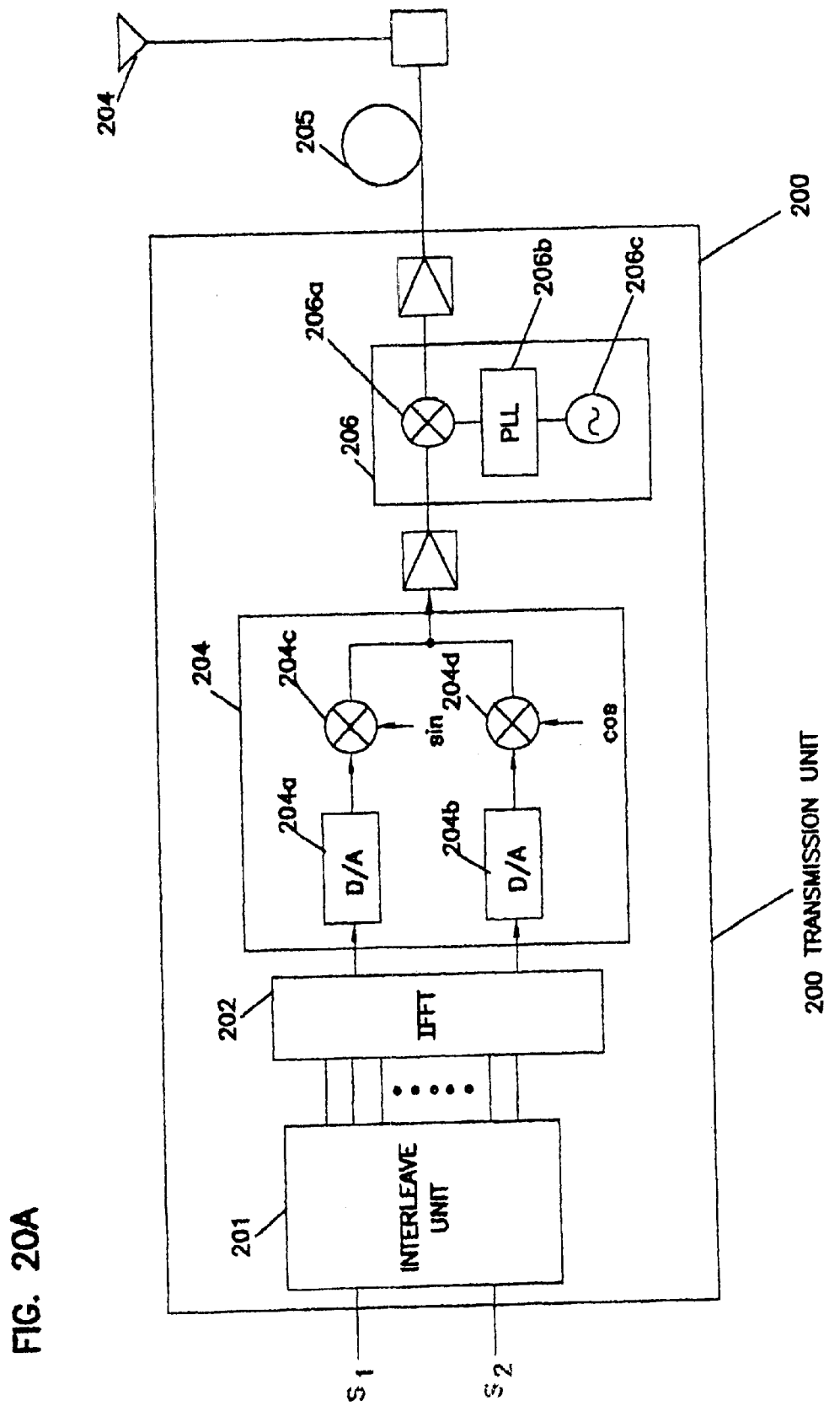
FIGS. 20A and 20B respectively illustrate another preferred embodiment of the reception unit and the transmission unit according to the current invention.
Figure 20B:
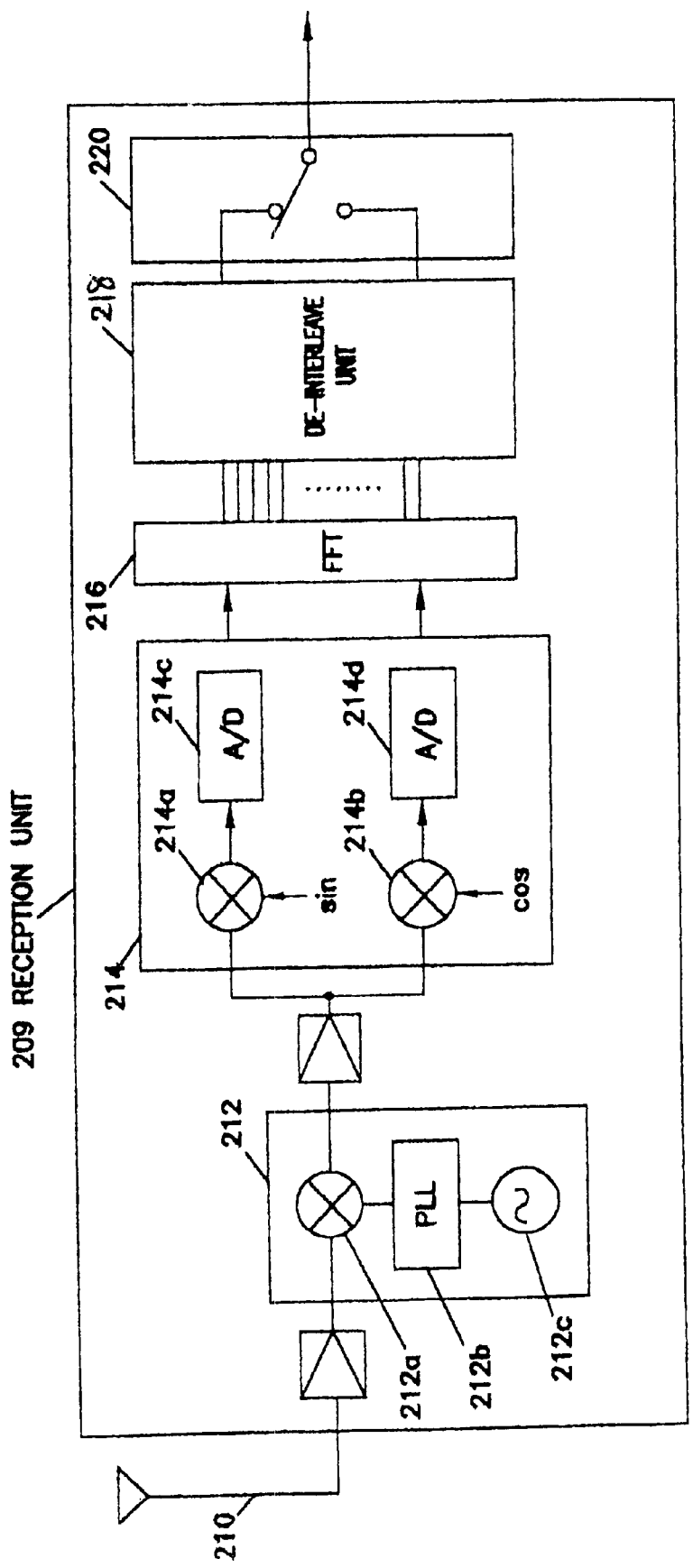

In an alternative road communication system, the stationary units transmit the same informational data to the car using a common carrier frequency. The informational signal is modulated at each of the stationary units based upon a predetermined common orthogonal frequency division multiplex (OFDM) modulation technique. The informational signal is also interleaved in the time dimension. FIGS. 20A and 20B respectively illustrate another preferred embodiment of the reception unit and the transmission unit according to the current invention. Referring to FIG. 20A, a block diagram illustrates components of the preferred embodiment of the transmission unit 200 according to the current invention. In general, transmission components of the transmission unit 200 utilizes the orthogonal frequency division multiplex (OFDM) modulation technique which multiplexes a plurality of orthogonal frequency carriers for transmitting divided data. The transmission unit 200 generally includes an interleave unit 201, an inverse Fourier function transformation (IFFT) circuit 202, a quadrature phase shift keying (QPSK) modulation circuit 204 and an up-converter 206. The interleave unit 201 performs interleaving of the input signals S1 and S2. The IFFT circuit 202 performs the inverse Fourier transformation on each of parallel input signals S1 and S2 and serially translates the inversely transformed data back to serial data. Finally, the IFFT circuit 202 time compresses the serial data and determines a guard time by placing a rear symbol in a forward position. The IFFT circuit 202 outputs two signals to the QPSK circuit 204. One signal has either 0° or 180° phase, and the other signal has either 90° or 270° phase.

Still referring to FIG. 20A, the QPSK circuit 204 modulates output signals from the IFFT circuit 202 and the up-converter 206 generates a radio signal. The QPSK circuit 204 further includes a pair of digital-to-analog converters (D/A) 204a and 204b as well as a pair of multipliers 204c and 204d. The first D/A converter 204a outputs a signal to the multiplier 204c to multiply by a sine signal so as to produce an output signal having either 0° or 180° phase.

Similarly, the second D/A converter 204b outputs a signal to the multiplier 204d to multiply by a cosine signal so as to produce an output signal having either 90° or 270° phase. The multiplied signals are added before being outputted. The up-converter 206 converts the output signal from the QPSK circuit 204 to a radio frequency. The up-converter 206 includes a local oscillator 206c, a PLL 206b and a multiplier 206a. It is desired that the precision of the local oscillator 206c be the same order as a quotient of a speed of a car divided by the radio signal speed in view of a Doppler effect caused by the moving car. A commercially available oscillator can sufficiently match the above required precision. The oscillator 206c outputs a signal to the PLL 206b, and the output of the PLL 206b is multiplied with the output signal from the up-converter 206 before being outputted from the transmission unit 200. The output signal from the up-converter 206 is inputted into the antenna 204 via the cable 205 and is transmitted as a radio signal from the antenna 204.

Now referring to FIG. 20B, a block diagram illustrates components of the preferred embodiment of the reception unit 209 according to the current invention. The reception unit 209 includes an antenna 210, a down-converter 212, a (QPSK) modulation circuit 214, a Fourier function transformation (FFT) circuit 216, a de-interleave unit 218, and a switch control circuit 220. The antenna 210 receives the radio signal transmitted from the transmission unit 200 and outputs to the down-converter 212. The downconverter 212 converts the received radio signal to an analog signal and outputs to the QPSK circuit 214. The down-converter 212 further includes a multiplier 212a, a PLL unit 212b and an oscillator 212c. The QPSK circuit 214 includes a pair of multipliers 214a and 214b as well as a pair of analog to digital (A/D) converters 214c and 214d. The multipliers respectively multiply the analog signal by a sine signal and a cosine signal, and the outputs are respectively converted to a digital signal by the A/D converters 214c and 214d. The QPSK circuit 214 demodulates the digital signals and outputs the two demodulated digital signals to the FFT circuit 216, which performs the Fourier transformation on each of parallel input signals to generate output signals S1 and S2. The signals S1 and S2 each have a valid symbol length Ts. The de-interleave unit 218 further processes the demodulated but still interleaved signals S1 and S2. Finally, the switch circuit 220 select one of the output signals S1 and S2. One implementation of the switch circuit 220 is a semi conductor.

Now referring to FIG. 21, the prioritized and segmented data transmission and reception are illustrated. A segment is made of a predetermined number of subcarriers, and a plurality of the segments are used to implement the improved transmission and reception. To illustrate a need for the priority transmission, FIG. 21A shows that each of the base stations BS1 through BS6 transmits two types of data respectively in an upper frequency side and a lower frequency side. These frequency sides may be implemented as a segment. For example, a base station BS1 transmits a data type A on the upper side frequency as well as a data type C on the lower side frequency. As shown in FIG. 21B, the upper side transmits two different data sets A and B, and as a mobile receiving unit moves in the direction from the BS1 to the BS6, the mobile receiving unit switches from the data set A to the data set B. On the other hand, the same mobile receiving unit keeps receiving the common data set C throughout the same travel. For example, the data sets A and B may be containing location-sensitive information such as speed limit and so on while the data set C may be system-related information. However, as FIG. 21B shows that between the base stations BS3 and BS4, interference occurs as indicated by hatched lines. Because of the interference, the transition from the data set A to B is not seamless and interrupted. This interruption is critical for certain types of prioritized data such as graphics.

FIGS. 21C and 21D illustrate one exemplary method of improving the seamless reception in the data transition. FIG. 21C shows the same data transmission in the upper side. On the other hand, the base stations BS3 and 4 now transmit the interfered A data set in lieu of the original common C data set in the lower side. As the result of the above improved data transmission, FIG. 21D shows that during the interference in the transition of the data set A to B in the upper side, the mobile receiving unit can switch to the lower side to receive the data set A. To switch to the data set B, the mobile receiving unit switches back to the upper side. This method assumes that the data set C has a lower priority than the data set A or B, and the unavailability of the data set C from the stations BS3 and BS4 is not critical.

Now referring to FIGS. 22A, 22B and 22C, a more complex example is illustrated to further explain how the segmented transmission improves the efficiency. Stationary stations St0 through St7 are adjacently located, and each of the stationary stations St0–St7 transmits data using five segmented signals A through E. As described above, the segment comprises a predetermined number of subcarriers. For example, the stationary station transmits data X using the segments A, B and C as well as data W using the segment D and E. When the stationary stations St0–St7 transmits data as shown in FIG. 22A, some interference occurs due to two different data on the same segmented signal from the two adjacent stations.

Based upon the transmission as shown in FIG. 22A, the signal interference is illustrated in FIG. 22B. On the segment A, since the adjacent stationary stations St1 and St2 respectively transmit data X and Y, there is some interference between the two stationary stations on the segment A, and the interference is indicated by hatched lines. Because the data W, X, Y and Z are transmitted as a certain predetermined sequence over the segments as shown in FIG. 22A, the signal interference emerges also in a certain predetermined sequence. A number N is a number which indicates a size of the sequence. On the segment A, the stationary station St1 experiences the interference, and there are four stationary stations including the stationary station St1 before the next affected stationary station St5. The number N is 4 in this sequence.

The above example of the segmented transmission improves the efficiency in use of a given frequency band. To appreciate the improvement, referring to FIG. 22C, the above example is compared to another use. FIG. 22C illustrates that some interference is indicated for transmitting data x and y using two segments A and B between two adjacent stationary stations. The usage efficiency of a given frequency band is generally defined as 1-1/N. For the usage efficiency for the example of FIG. 22C is 1½=50%. On the other hand, the usage efficiency for the example of FIGS. 22A and 22B is 1¼=75%. Thus, the use of the five segments over the two segments improves the usage efficiency of a given frequency band by 25%.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of transmitting information via a common frequency carrier between a mobile unit and a set of stationary units, comprising:

transmitting at least first data on a predetermined first subcarrier and second data on a predetermined second subcarrier between a first stationary unit and said mobile unit for communication within a predetermined first transmission area;

transmitting at least third data on said predetermined first subcarrier and said second data on said predetermined second subcarrier between a second stationary unit and said mobile unit for communication within a predetermined second transmission area, said second stationary unit being located near said first stationary unit, said predetermined first transmission area and said predetermined second transmission area being partially overlapping; and maintaining communication among said mobile unit, said first stationary unit and said second stationary unit while said mobile unit is moving from said predetermined first transmission area to said predetermined second transmission area.

2. The method of transmitting information via a common frequency carrier between a mobile unit and a set of stationary units according to claim 1 further comprising:

switching the use of said second data transmitted by said first stationary unit to said second data transmitted by said second stationary unit while said mobile unit is moving from said predetermined first transmission area to said predetermined second transmission area.

3. The method of transmitting information via a common frequency carrier between a mobile unit and a set of stationary units according to claim 2 wherein said switching is based upon detection of a marker placed at a predetermined location along said first transmission area and said second transmission area.

4. The method of transmitting information via a common frequency carrier between a mobile unit and a set of stationary units according to claim 1 further comprising:

switching the use of said second data transmitted by said first stationary unit to said third data transmitted by said second stationary unit while said mobile unit is moving from said predetermined first transmission area to said predetermined second transmission area.

5. The method of transmitting information via a common frequency carrier between a mobile unit and a set of stationary units according to claim 4 wherein said switching is based upon quality of reception of said communication at said mobile unit.

6. The method of transmitting information via a common frequency carrier between a mobile unit and a set of stationary units according to claim 4 wherein said switching is based upon an error rate in the communication at said mobile unit.

7. The method of transmitting information via a common frequency carrier between a mobile unit and a set of stationary units according to claim 5 wherein a relative position of said mobile unit is determined based upon the quality of the reception.

8. The method of transmitting information via a common frequency carrier between a mobile unit and a set of stationary units according to claim 1 further comprising:

switching the use of said first data transmitted by said first stationary unit to said second data transmitted by said first stationary unit while said mobile unit is moving within said predetermined first transmission area.

9. The method of transmitting information via a common frequency carrier between a mobile unit and a set of stationary units according to claim 1 wherein said first subcarrier, said second subcarrier are each a portion of said common frequency carrier by subdividing said common frequency carrier into blocks along a frequency axis.

10. The method of transmitting information via a common frequency carrier between a mobile unit and a set of stationary units according to claim 9 wherein said first data and said second data are arranged on a frequency axis.

11. The method of transmitting information via a common frequency carrier between a mobile unit and a set of stationary units according to claim 10 wherein said first data and said second data are arranged on a time axis.

12. The method of transmitting information via a common frequency carrier between a mobile unit and a set of stationary units according to claim 11 wherein data is transmitted by said first subcarrier and said second subcarrier in a predetermined first order and is read in a predetermined second order.

13. The method of transmitting information via a common frequency carrier between a mobile unit and a set of stationary units according to claim 12 wherein said first data and said second data are further processed by an inverse Fourier transform before said transmitting act, said processed first and second data later undergoing a Fourier transform and rearrangement at said mobile unit.

14. The method of transmitting information via a common frequency carrier between a mobile unit and a set of stationary units according to claim 1 wherein said first subcarrier and said second subcarrier are transmitted on an orthogonal frequency division multiplex modulation.

15. The method of transmitting information via a common frequency carrier between a mobile unit and a set of stationary units according to claim 1 wherein said transmitting at said first stationary unit and said second stationary unit involves an optical fiber radio signal transmission technique.

16. The method of transmitting information via a common frequency carrier between a mobile unit and a set of stationary units according to claim 1 wherein said maintaining communication act further includes an act of transmitting data from mobile unit to said first stationary unit and said second stationary unit.

17. The method of transmitting information via a common frequency carrier between a mobile unit and a set of stationary units according to claim 1 wherein at least said first subcarrier and said second subcarrier are alternately arranged by a predetermined sequence on a frequency axis.

18. The method of transmitting information via a common frequency carrier between a mobile unit and a set of stationary units according to claim 17 wherein said first subcarrier and said second subcarrier are modulated by phase shift keying.

19. The method of transmitting information via a common frequency carrier between a mobile unit and a set of stationary units according to claim 1 wherein said first data, said second data, said third data are respectively assigned to include one of predetermined types of information, said first data, said second data, said third data being prioritized for transmission based upon said predetermined types.

20. The method of transmitting information via a common frequency carrier between a mobile unit and a set of stationary units according to claim 19 wherein a certain type of said predetermined types of said information is replaced by a certain another type of said predetermined types during the transmission.

21. The method of transmitting information via a common frequency carrier between a mobile unit and a set of stationary units according to claim 19 wherein said first subcarrier and said second subcarrier each further include a first predetermined number of subcarriers, a segment being defined to include a second predetermined number of subcarriers, the first predetermined number being at least a multiple of the second predetermined number, said first data, said second data, said third data being mapped onto said segment in a predetermined sequence.

22. A method of transmitting information via a common frequency carrier between a mobile unit and a set of stationary unit, comprising the steps of:

transmitting a first information signal which is modulated by orthogonal frequency division multiplex modulation between a first stationary unit and said mobile unit for communication within a predetermined first transmission area, said first information signal including a first data set and a second data set, said first data set and said second data set being arranged in a predetermined pattern;

transmitting a second information signal which is modulated by said orthogonal frequency division multiplex modulation between a second stationary unit and said mobile unit for communication within a predetermined second transmission area, said second information signal including said second data set and a third data set, said second data set and said third data set being arranged in the predetermined pattern, wherein said second stationary unit being located near said first stationary unit, said predetermined first transmission area and said predetermined second transmission area being partially overlapping; and maintaining communication among said mobile unit, said first stationary unit and said second stationary unit while said mobile unit is moving from said predetermined first transmission area to said predetermined second transmission area.

23. The method of transmitting information via a common frequency carrier according to claim 22 wherein the predetermined pattern is along a frequency axis.

24. The method of transmitting information via a common frequency carrier according to claim 22 wherein the predetermined pattern is along a time axis.

25. A method of transmitting information via a common frequency carrier between a mobile unit and a set of stationary units, comprising:

transmitting an information signal which is modulated by orthogonal frequency division multiplex modulation between a first stationary unit and said mobile unit for communication within a predetermined first transmission area;

transmitting said information signal which is modulated by said orthogonal frequency division multiplex modulation between a second stationary unit and said mobile unit for communication within a predetermined second transmission area, said second stationary unit being located near said first stationary unit, said predetermined first transmission area and said predetermined second transmission area being partially overlapping; and maintaining communication among said mobile unit, said first stationary unit and said second stationary unit while said mobile unit is moving from said predetermined first transmission area to said predetermined second transmission area.

26. A system for transmitting information via a common frequency carrier between a mobile unit and a set of stationary units, comprising:

a first stationary unit for transmitting at least first data on a predetermined first subcarrier and second data on a predetermined second subcarrier within a predetermined first transmission area;

a second stationary unit located near said first stationary unit for transmitting at least third data on said predetermined first subcarrier and said second data on said predetermined second subcarrier within a predetermined second transmission area, said predetermined first transmission area and said predetermined second transmission area being partially overlapping; and a mobile unit for maintaining communication among said mobile unit, said first stationary unit and said second stationary unit while said mobile unit is moving from said predetermined first transmission area to said predetermined second transmission area.

27. The system for transmitting information via a common frequency carrier between a mobile unit and a set of stationary units according to claim 26 wherein said mobile unit further comprises a switch for switching the use of said second data transmitted by said first stationary unit to said second data transmitted by said second stationary unit while said mobile unit is moving from said predetermined first transmission area to said predetermined second transmission area.

28. The system for transmitting information via a common frequency carrier between a mobile unit and a set of stationary units according to claim 27 wherein said switch is activated based upon detection of a marker placed at a predetermined location along said first transmission area and said second transmission area.

29. The system for transmitting information via a common frequency carrier between a mobile unit and a set of stationary units according to claim 26 wherein said mobile unit further comprises a switch for switching the use of said second data transmitted by said first stationary unit to said third data transmitted by said second stationary unit while said mobile unit is moving from said predetermined first transmission area to said predetermined second transmission area.

30. The system for transmitting information via a common frequency carrier between a mobile unit and a set of stationary units according to claim 29 wherein said switch is activated based upon quality of reception of said communication at said mobile unit.

31. The system for transmitting information via a common frequency carrier between a mobile unit and a set of stationary units according to claim 30 further comprising a position detection unit for determining a relative position of said mobile unit based upon the quality of the reception.

32. The system for transmitting information via a common frequency carrier between a mobile unit and a set of stationary units according to claim 29 wherein said switch is activated based upon an error rate in the communication at said mobile unit.

33. The system for transmitting information via a common frequency carrier between a mobile unit and a set of stationary units according to claim 26 wherein said mobile unit further comprises a switch for switching the use of said first data transmitted by said first stationary unit to said second data transmitted by said first stationary unit while said mobile unit is moving within said predetermined first transmission area.

34. The system for transmitting information via a common frequency carrier between a mobile unit and a set of stationary units according to claim 26 wherein said first stationary unit and said second stationary unit transmit said first subcarrier and said second subcarrier on an orthogonal frequency division multiplex modulation.

35. The system for transmitting information via a common frequency carrier between a mobile unit and a set of stationary units according to claim 26 wherein said first stationary unit and said second stationary unit further includes a transmitter, an antenna and an optical fiber which connects said transmitter to said antenna.

36. The system for transmitting information via a common frequency carrier between a mobile unit and a set of stationary units according to claim 26 wherein said mobile unit transmits data to said first stationary unit and said second stationary unit.

37. The system for transmitting information via a common frequency carrier between a mobile unit and a set of stationary units according to claim 26 wherein said first stationary unit and said second stationary unit alternately arrange at least said first subcarrier and said second subcarrier in a predetermined sequence on a frequency axis.

38. The system for transmitting information via a common frequency carrier between a mobile unit and a set of stationary units according to claim 37 wherein said first stationary unit and said second stationary unit modulate said first subcarrier and said second subcarrier using a phase shift keying technique.

39. The system for transmitting information via a common frequency carrier between a mobile unit and a set of stationary units according to claim 26 wherein said first stationary unit and said second stationary unit generate said first subcarrier, said second subcarrier by subdividing said common frequency carrier into blocks along a frequency axis.

40. The system for transmitting information via a common frequency carrier between a mobile unit and a set of stationary units according to claim 39 wherein said first stationary unit and said second stationary unit arrange said first data and said second data on a frequency axis.

41. The system for transmitting information via a common frequency carrier between a mobile unit and a set of stationary units according to claim 39 wherein said first stationary unit and said second stationary unit arrange said first data and said second data on a time axis.

42. The system for transmitting information via a common frequency carrier between a mobile unit and a set of stationary units according to claim 41 wherein said first stationary unit and said second stationary unit transmit said first subcarrier, said second subcarrier in a predetermined first order and is read in a predetermined second order.

43. The system for transmitting information via a common frequency carrier between a mobile unit and a set of stationary units according to claim 42 wherein said first stationary unit and said second stationary unit respectively further performs an inverse Fourier transform on s aid first data and said second data before said transmission, said mobile unit performing a Fourier transform and rearrangement on said processed first and second data.

44. The system for transmitting information via a common frequency carrier between a mobile unit and a set of stationary units according to claim 26 wherein said first data, said second data, said third data are respectively assigned to include one of predetermined types of information, said first data, said second data, said third data being prioritized for transmission based upon said predetermined types.

45. The system for transmitting information via a common frequency carrier between a mobile unit and a set of stationary units according to claim 44 wherein a certain type of said predetermined types of said information is replaced by a certain another type of said predetermined types during the transmission.

46. The system for transmitting information via a common frequency carrier between a mobile unit and a set of stationary units according to claim 44 wherein said first subcarrier and said second subcarrier each further include a first predetermined number of subcarriers, a segment being defined to include a second predetermined number of subcarriers, the first predetermined number being at least a multiple of the second predetermined number, said first data, said second data, said third data being mapped onto said segment in a predetermined sequence.

47. A system for transmitting information via a common frequency carrier between a mobile unit and a set of stationary units, comprising:

a first stationary unit for transmitting a first information signal which is modulated by orthogonal frequency division multiplex modulation within a predetermined first transmission area, said first information signal including a first data set and a second data set, said first data set and said second data set being arranged in a predetermined pattern;

a second stationary unit for transmitting a second information signal which is modulated by said orthogonal frequency division multiplex modulation within a predetermined second transmission area;, said predetermined first transmission area and said predetermined second transmission area being partially overlapping, said second information signal including said second data set and a third data set, said second data set and said third data set being arranged in the predetermined pattern; and a mobile unit for maintaining communication among said mobile unit, said first stationary unit and said second stationary unit while said mobile unit is moving from said predetermined first transmission area to said predetermined second transmission area.

48. The system for transmitting information via a common frequency carrier according to claim 47 wherein the predetermined pattern is along a frequency axis.

49. The system for transmitting information via a common frequency carrier according to claim 47 wherein the predetermined pattern is along a time axis.

50. A system for transmitting information via a common frequency carrier between a mobile unit and a set of stationary units, comprising:

a first stationary unit for transmitting an information signal which is modulated by orthogonal frequency division multiplex modulation within a predetermined first transmission area;

a second stationary unit for transmitting said information signal which is modulated by said orthogonal frequency division multiplex modulation within a predetermined second transmission area;, said predetermined first transmission area and said predetermined second transmission area being partially overlapping; and a mobile unit for maintaining communication among said mobile unit, said first stationary unit and said second stationary unit while said mobile unit is moving from said predetermined first transmission area to said predetermined second transmission area.

* * * * *